(12) United States Patent
Ha et al.

(10) Patent No.: US 12,529,493 B2
(45) Date of Patent: Jan. 20, 2026

(54) AIR CLEANER

(71) Applicant: LG ELECTRONICS INC., Seoul (KR)

(72) Inventors: Jiug Ha, Seoul (KR); Kangeui Cho, Seoul (KR); Sungkyong Han, Seoul (KR); Sehwan Bae, Seoul (KR); Myungwhoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 622 days.

(21) Appl. No.: 17/915,949

(22) PCT Filed: May 4, 2020

(86) PCT No.: PCT/KR2020/005836
§ 371 (c)(1),
(2) Date: Sep. 29, 2022

(87) PCT Pub. No.: WO2021/201334
PCT Pub. Date: Oct. 7, 2021

(65) Prior Publication Data
US 2023/0194120 A1 Jun. 22, 2023

(30) Foreign Application Priority Data
Mar. 31, 2020 (KR) .................. 10-2020-0039393

(51) Int. Cl.
*F24F 11/79* (2018.01)
*F24F 8/10* (2021.01)
*F24F 13/10* (2006.01)

(52) U.S. Cl.
CPC .............. *F24F 11/79* (2018.01); *F24F 8/10* (2021.01); *F24F 13/10* (2013.01)

(58) Field of Classification Search
CPC ............... F24F 11/79; F24F 8/10; F24F 13/10
(Continued)

(56) References Cited

U.S. PATENT DOCUMENTS 5,641,343 A * 6/1997 Frey ..................... B01D 46/521
55/330
9,821,259 B2 * 11/2017 Bae .................... B01D 46/0008
(Continued)

FOREIGN PATENT DOCUMENTS

| CN | 210050882 U | 2/2020 |
| JP | 5740503 B2 | 6/2015 |

(Continued)

*Primary Examiner* — Avinash A Savani
*Assistant Examiner* — Dana K Tighe
(74) *Attorney, Agent, or Firm* — Birch, Stewart, Kolasch & Birch, LLP

(57) ABSTRACT

The present application proposes an air cleaner including a blower configured to inhale air from an outside, filter the inhaled air, and discharge the filtered air; a flow adjusting device disposed above the blower, wherein the flow adjusting device is configured to inhale the air discharged from the blower, adjust a discharge direction of the inhaled air and discharge the air therefrom to the outside in a adjusted direction; and a guide member having one end passing through an upper surface of the blower and received in the blower, and the other end connected to the flow adjusting device. The guide member is configured to retract into an interior of the blower or extend from the upper surface of the blower to induce position change of the flow adjusting device. The angle defined between the upper surface of the flow adjusting device and the upper surface of the blower increases or decreases primarily based on an extent to which the guide member extends from the blower.

20 Claims, 30 Drawing Sheets

(58) Field of Classification Search
USPC .......................................................... 454/228
See application file for complete search history.

(56) References Cited

U.S. PATENT DOCUMENTS

| | | | |
|---|---|---|---|
| 9,950,289 B2* | 4/2018 | Jung | .................. B01D 46/0045 |
| 11,674,714 B2* | 6/2023 | Kang | ...................... F24F 13/28 |
| | | | 96/223 |
| 2014/0194051 A1 | 7/2014 | Shang et al. | |
| 2017/0246581 A1 | 8/2017 | Jung et al. | |

FOREIGN PATENT DOCUMENTS

| | | |
|---|---|---|
| KR | 10-2016-0012796 A | 2/2016 |
| KR | 10-2017-0090288 A | 8/2017 |
| KR | 10-2019-0114475 A | 10/2019 |

* cited by examiner

[Fig. 1]
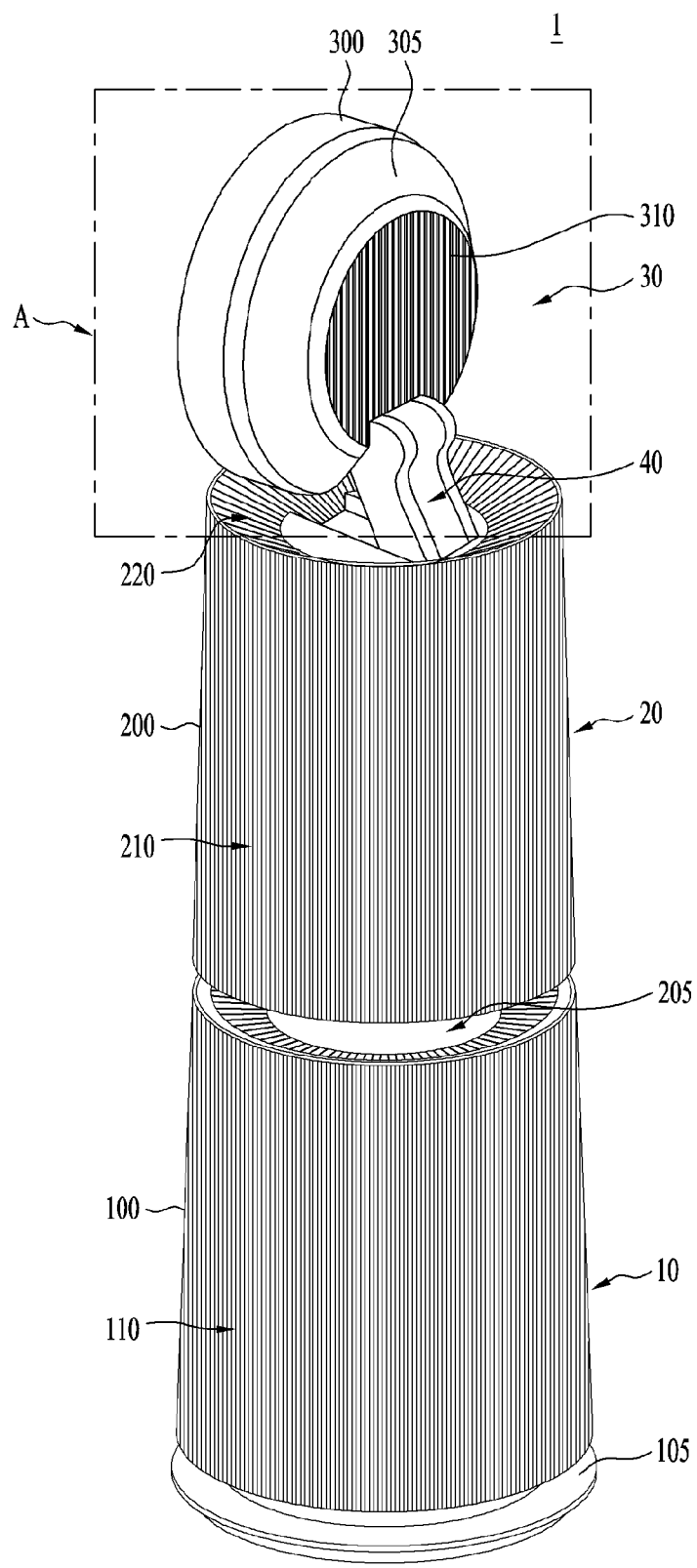

[Fig. 2]
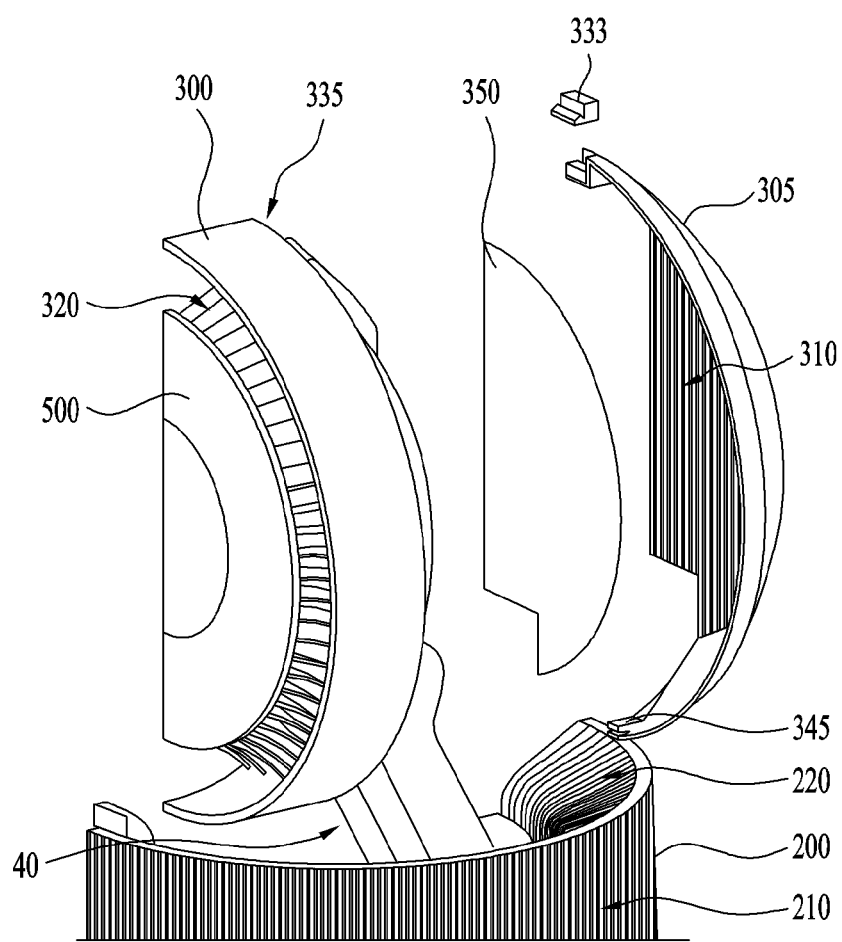

[Fig. 3]
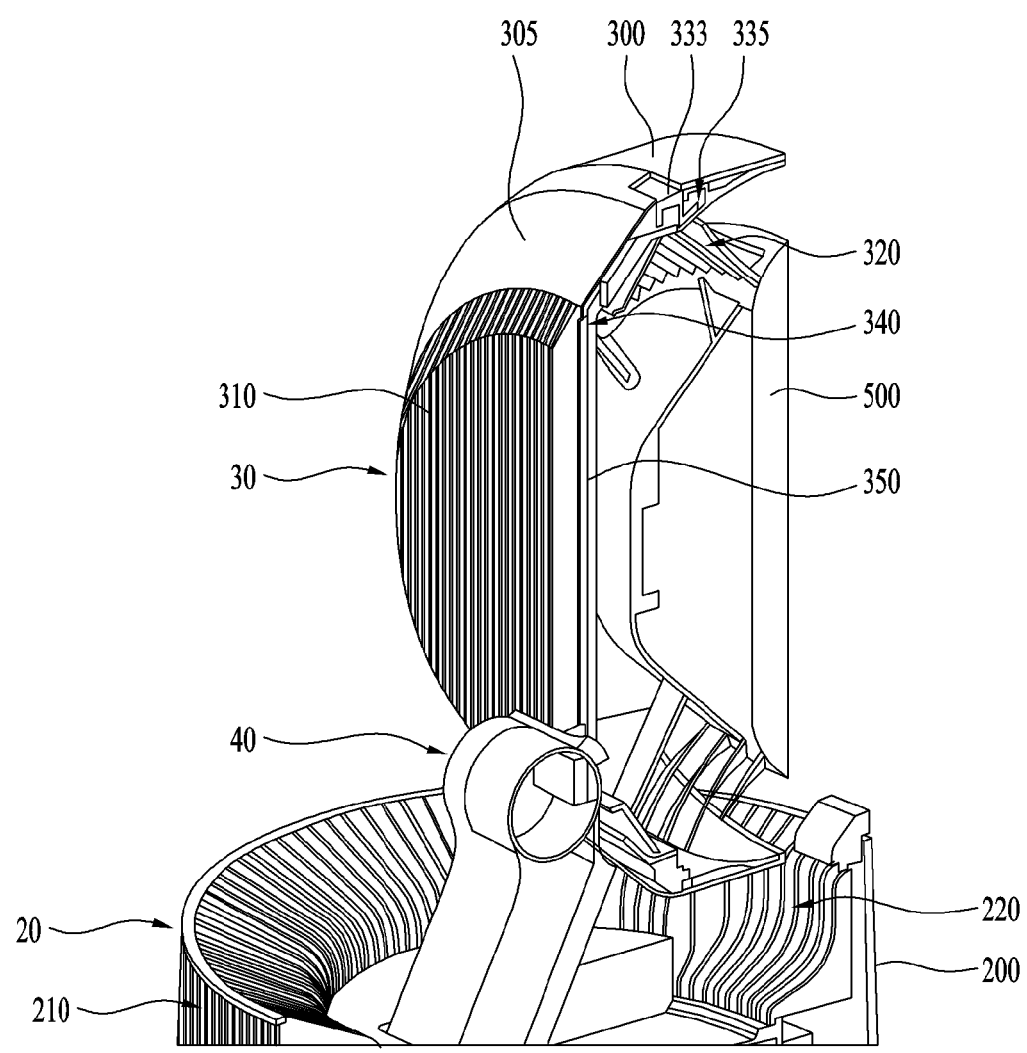

[Fig. 4]
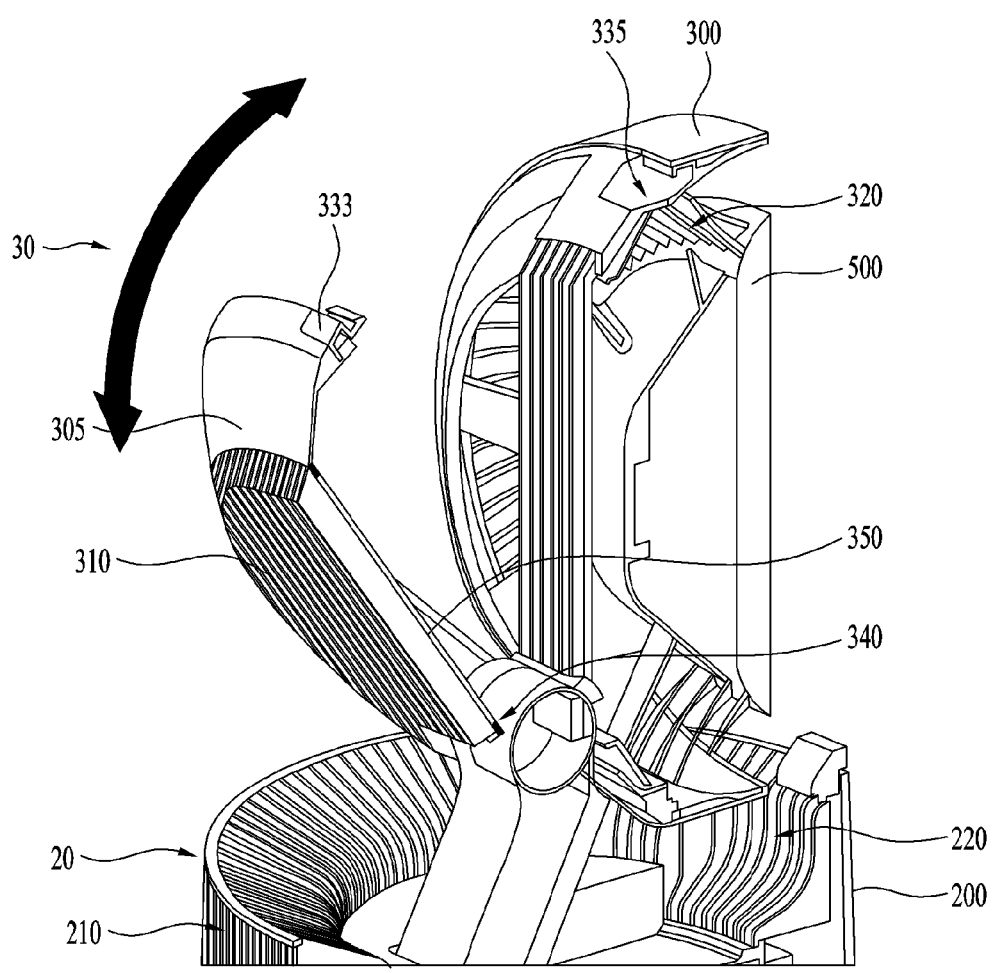

[Fig. 5]
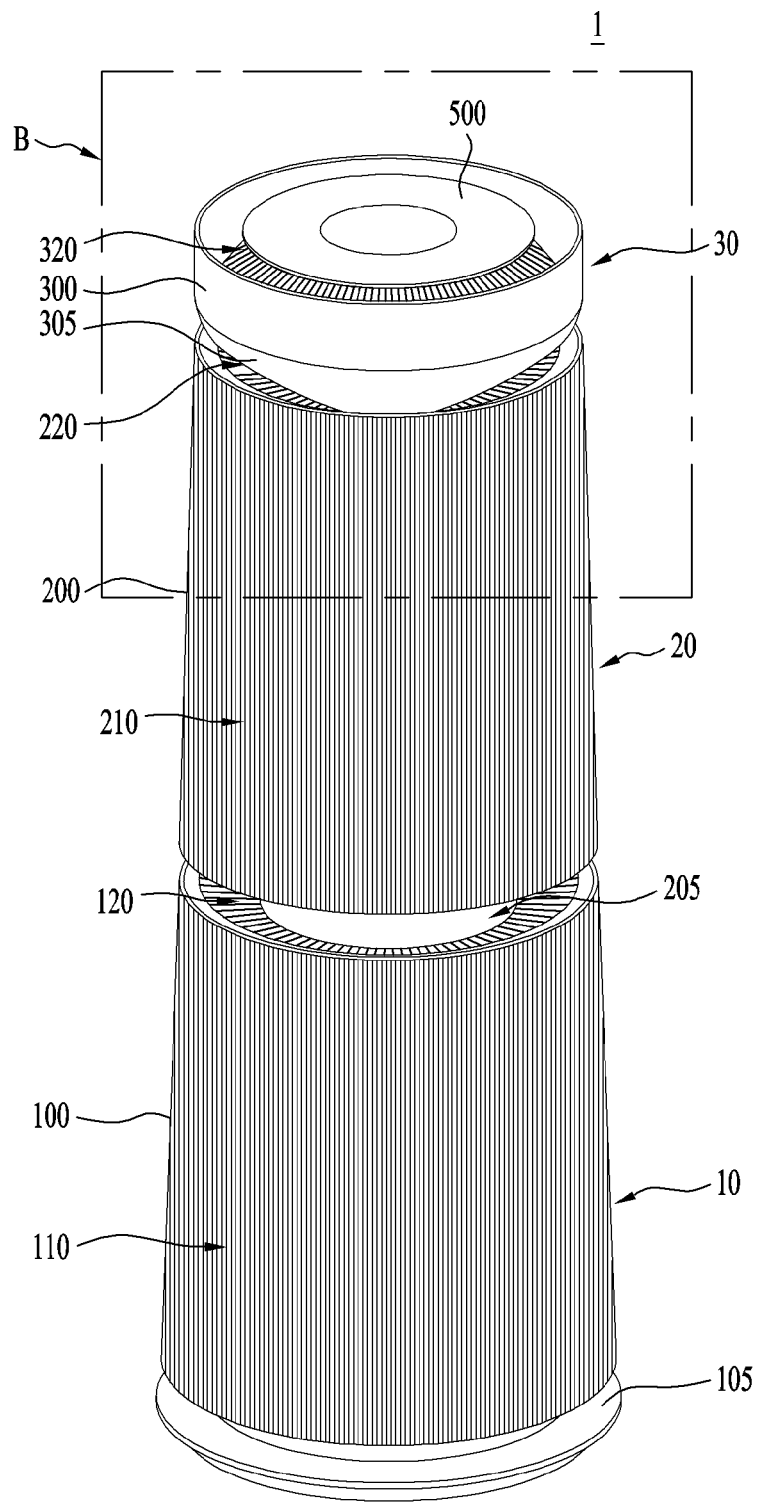

[Fig. 6]
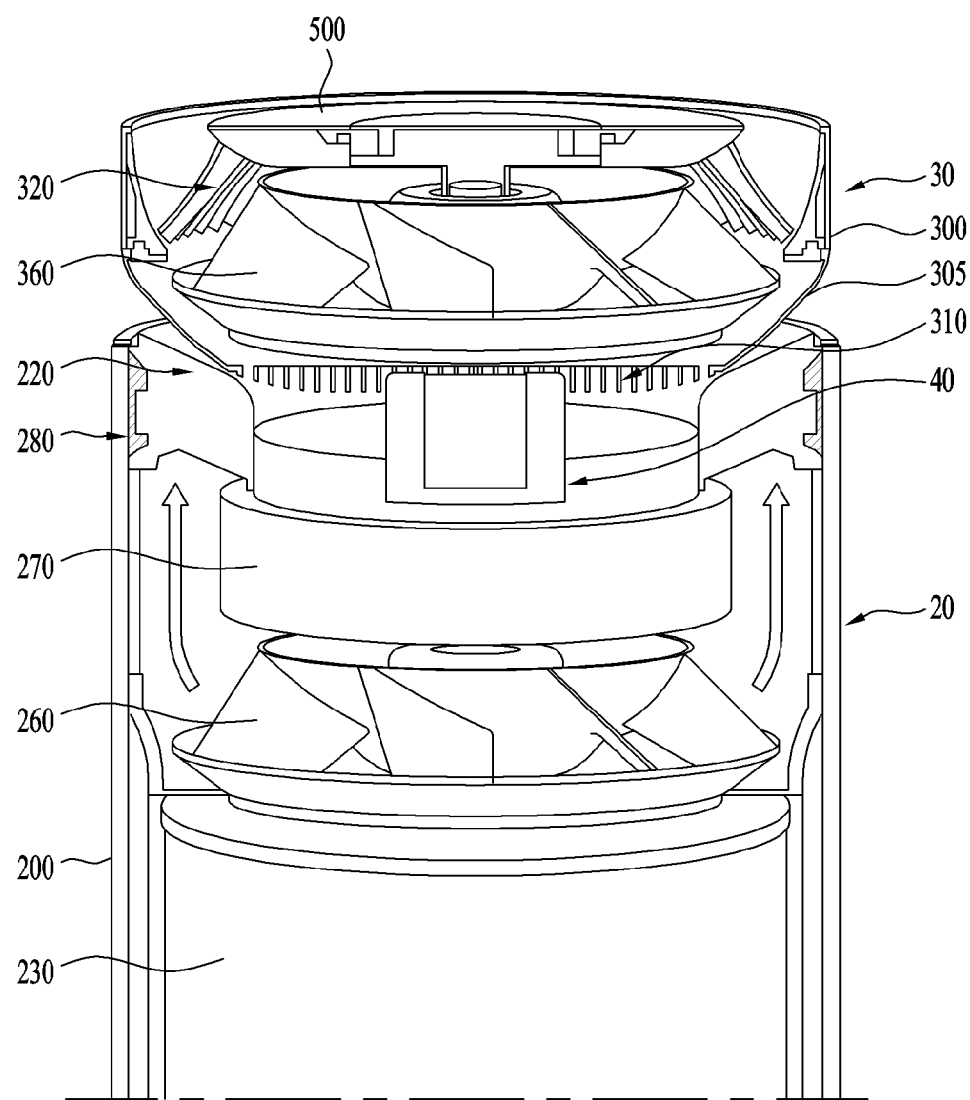

[Fig. 7]
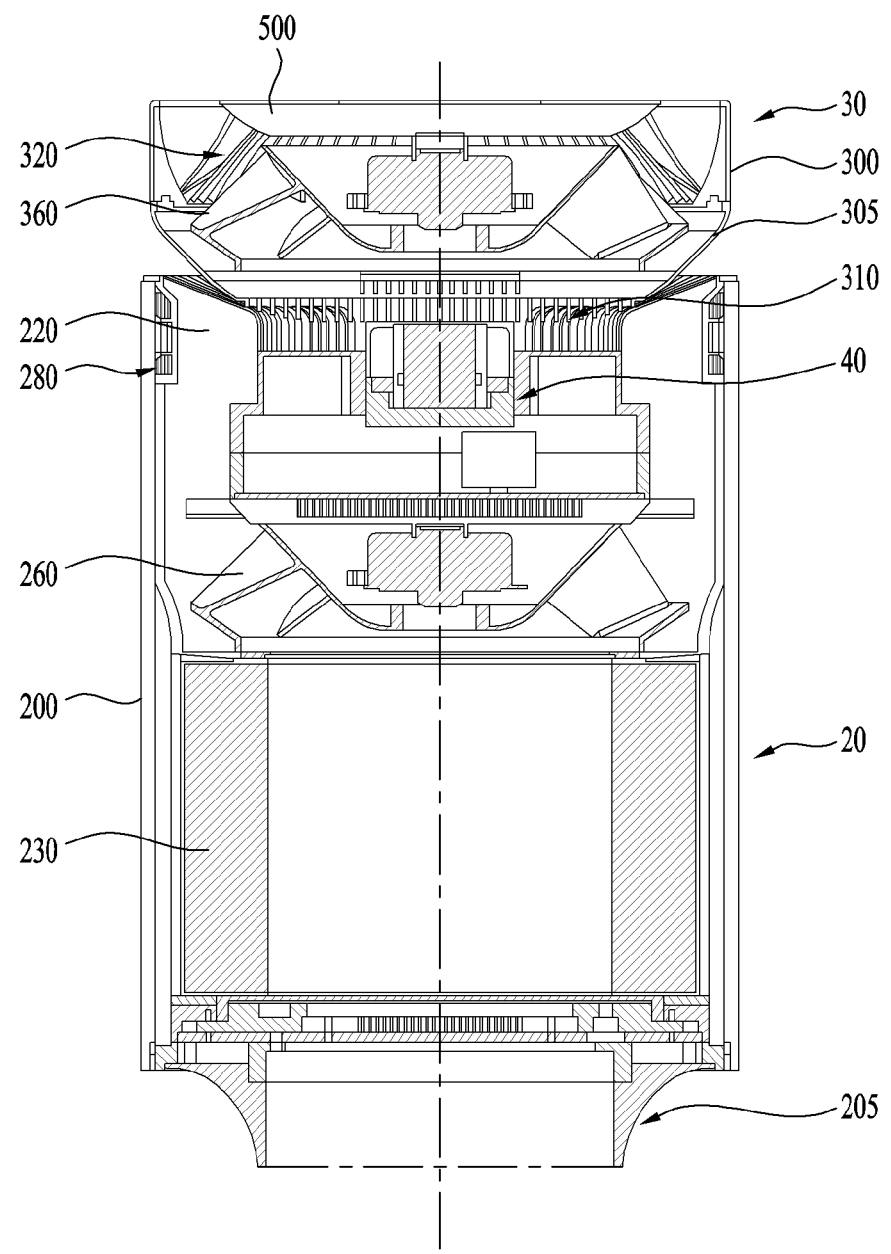

[Fig. 8]
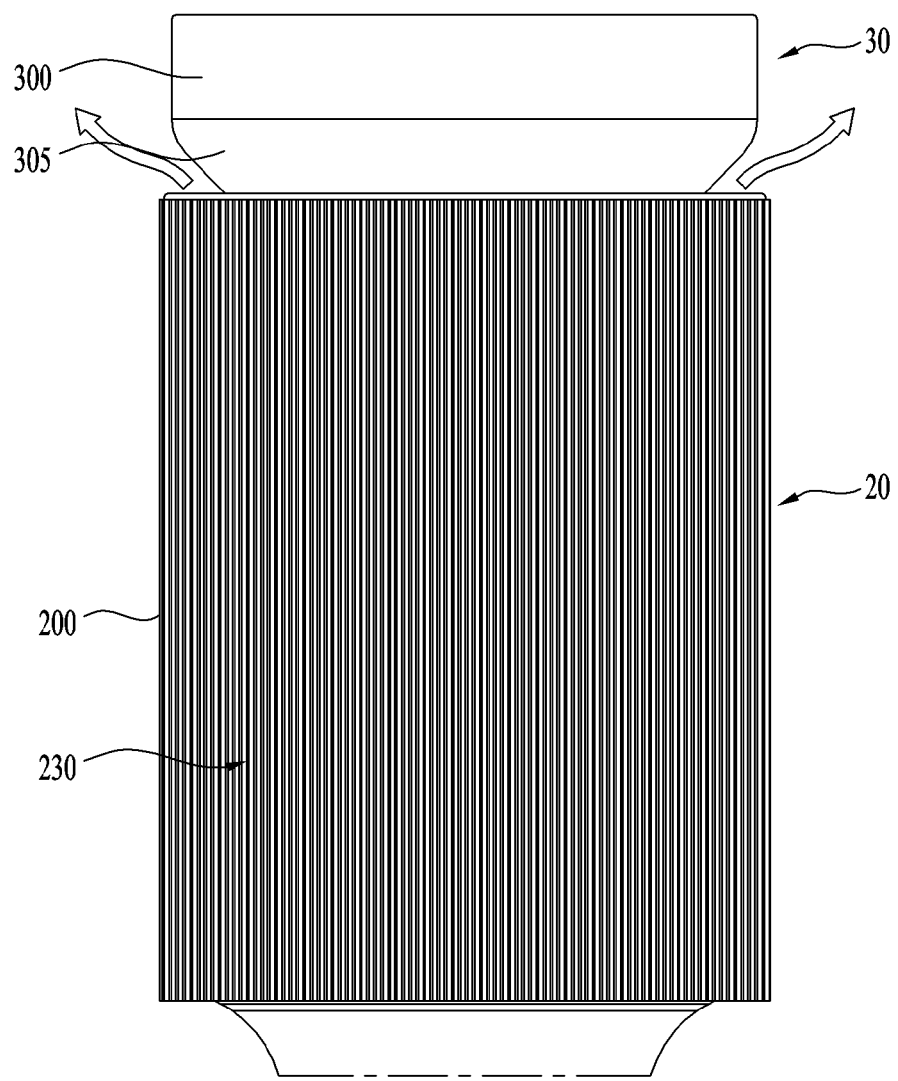

[Fig. 9]
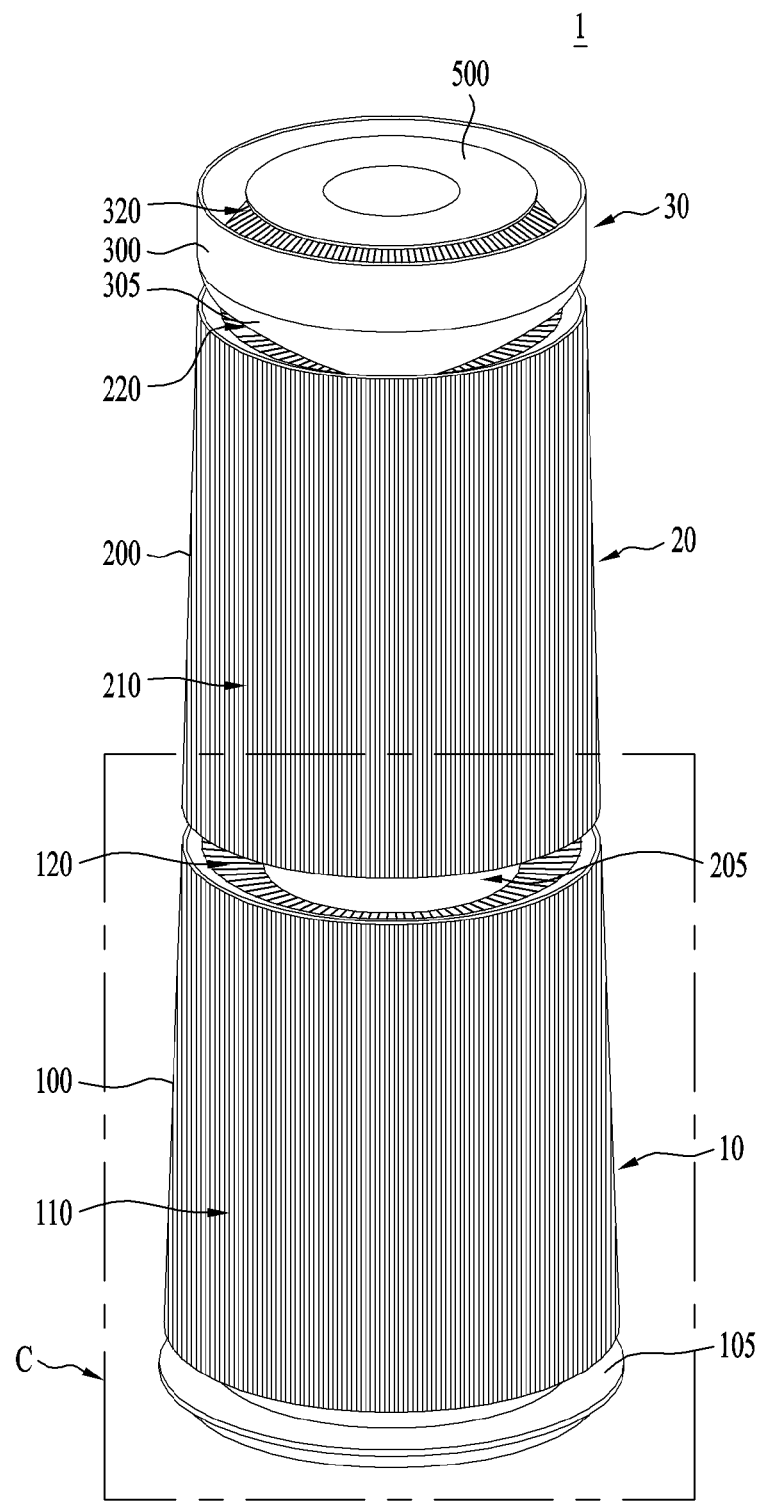

[Fig. 10]
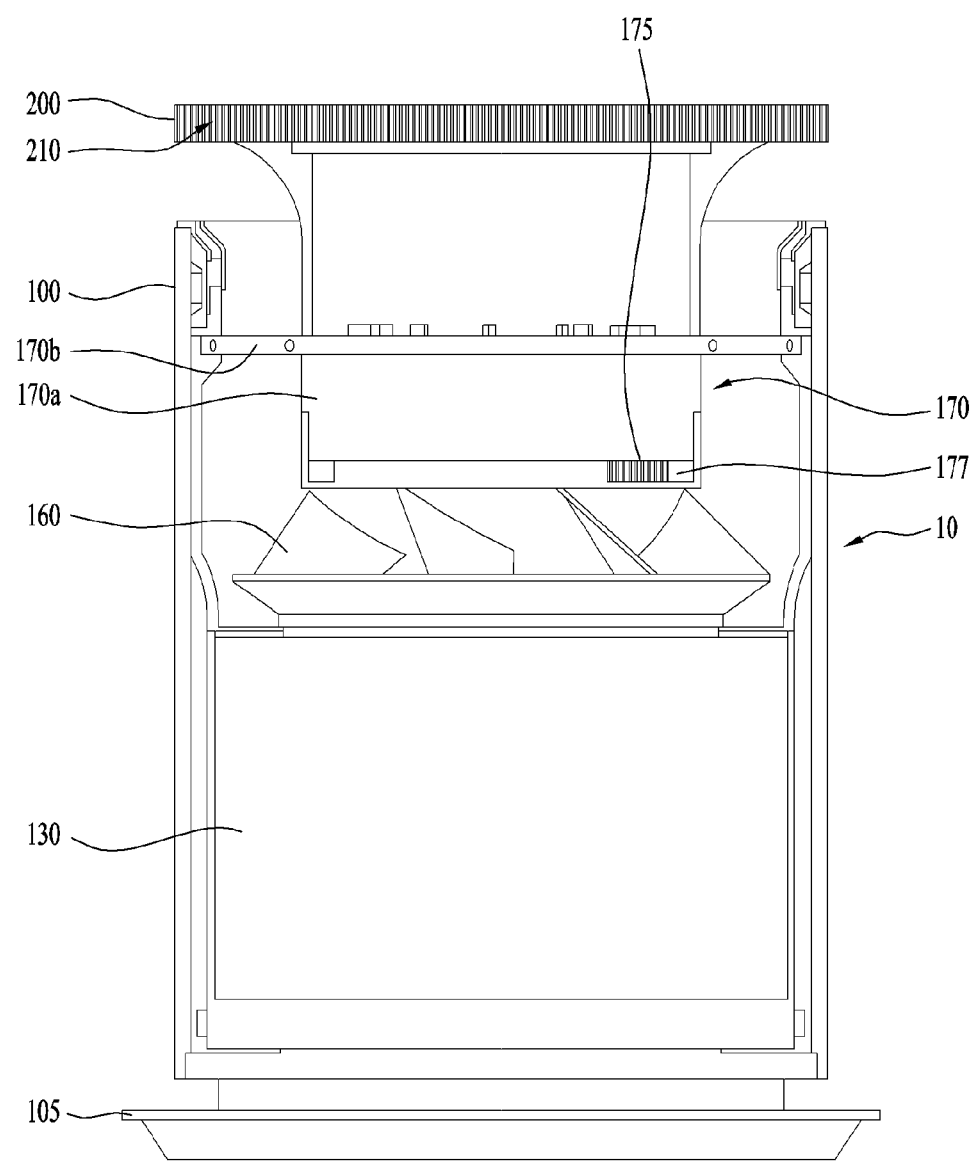

[Fig. 11]
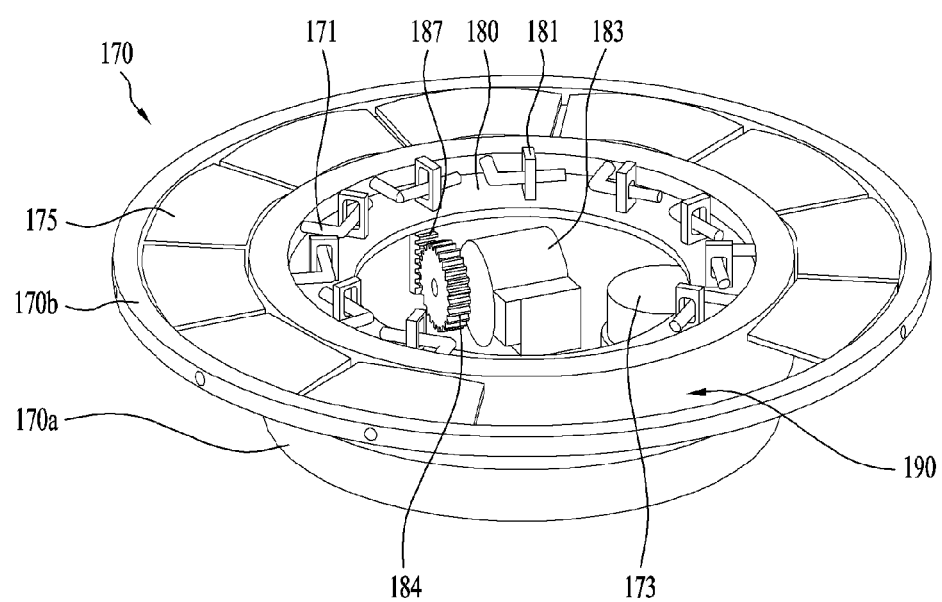

[Fig. 12]
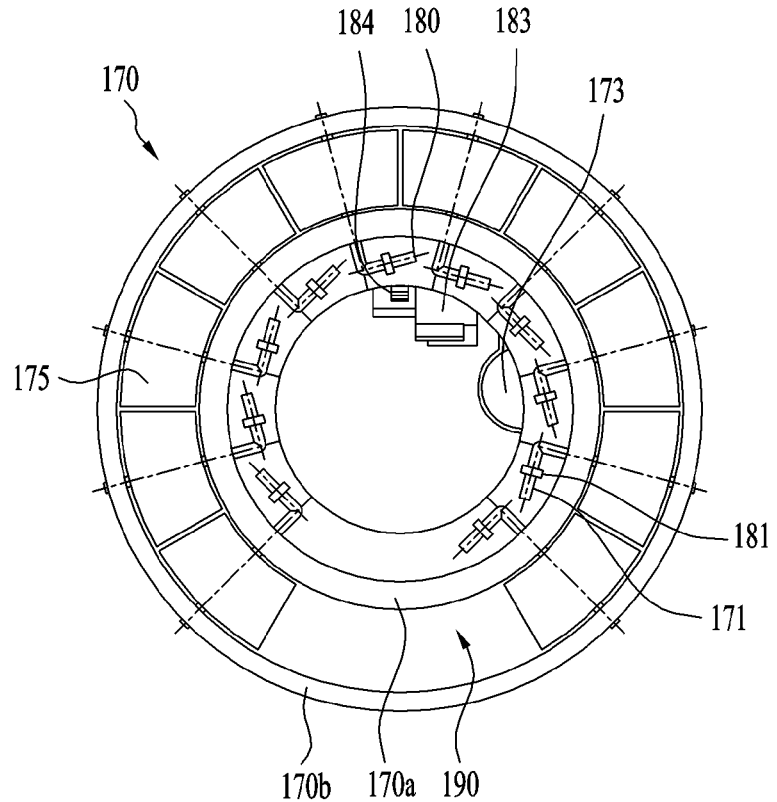
[Fig. 13]
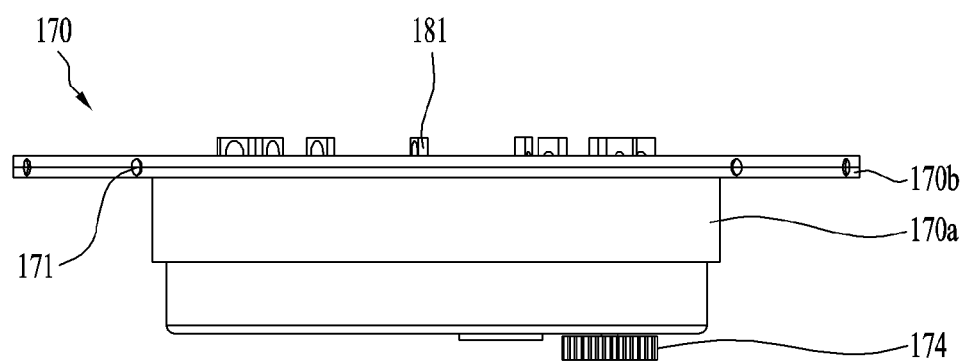

[Fig. 14]
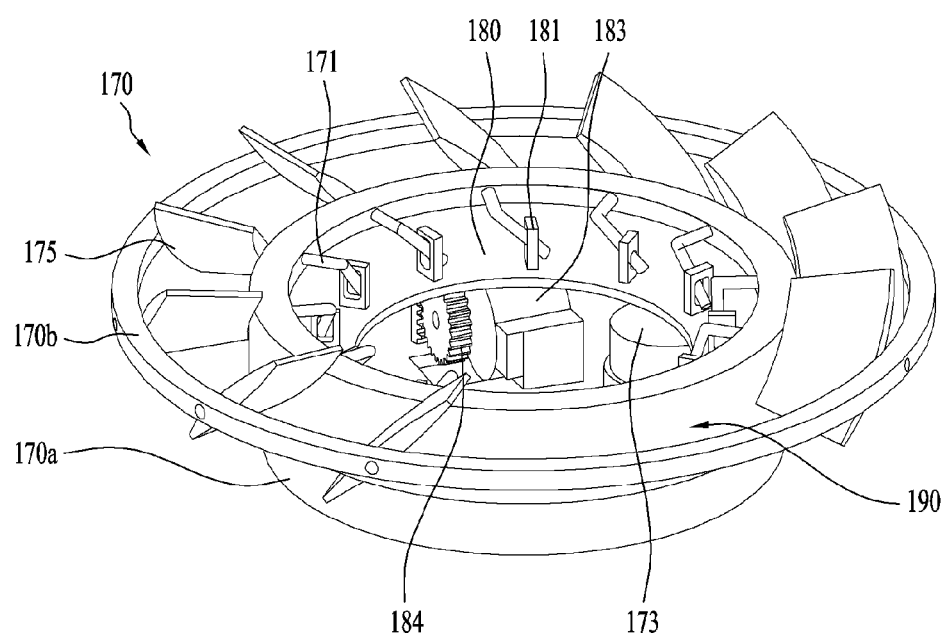

[Fig. 15]
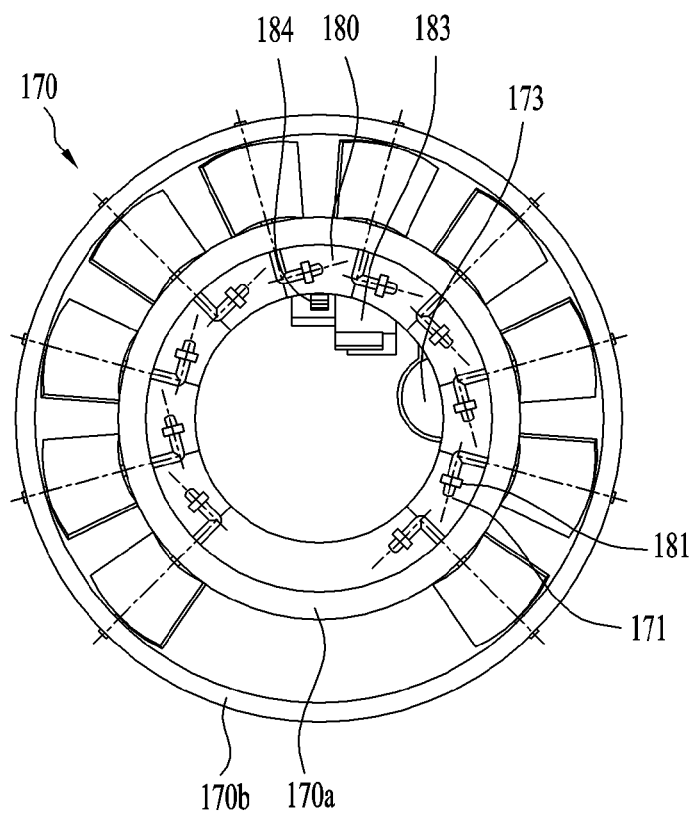
[Fig. 16]
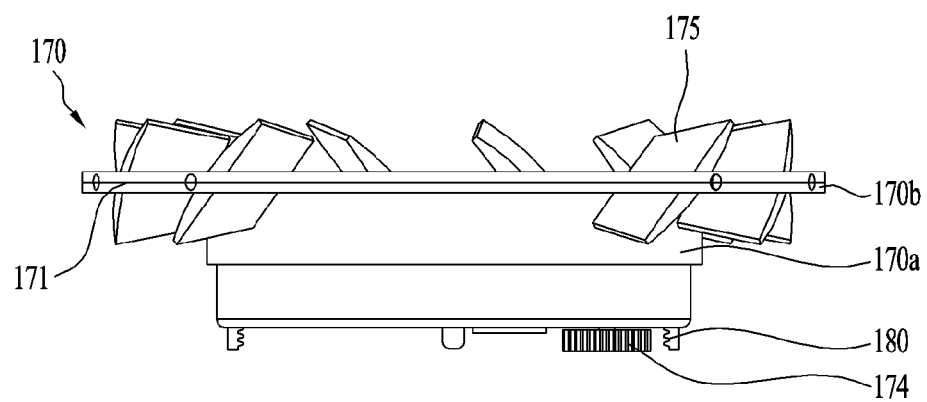

[Fig. 17]
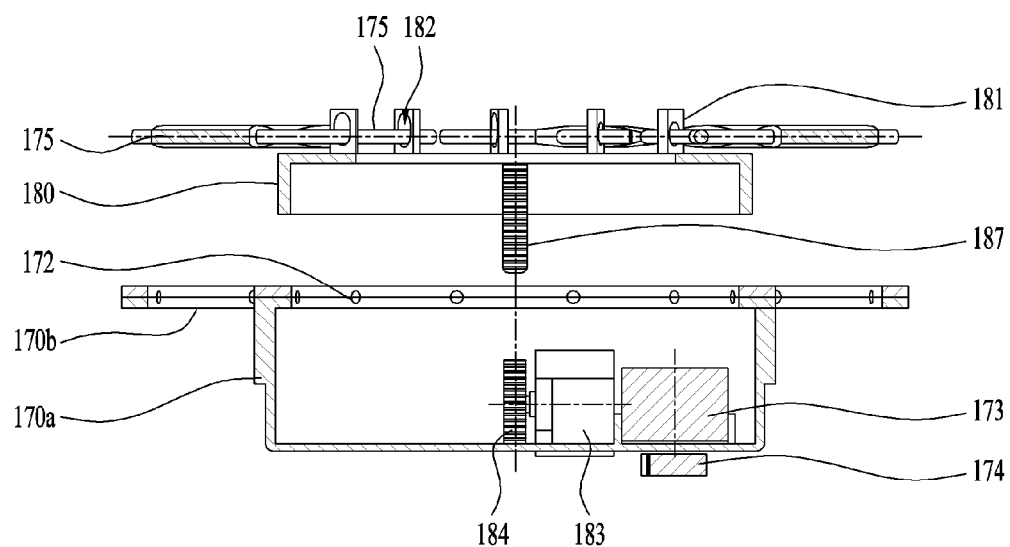

[Fig. 18]
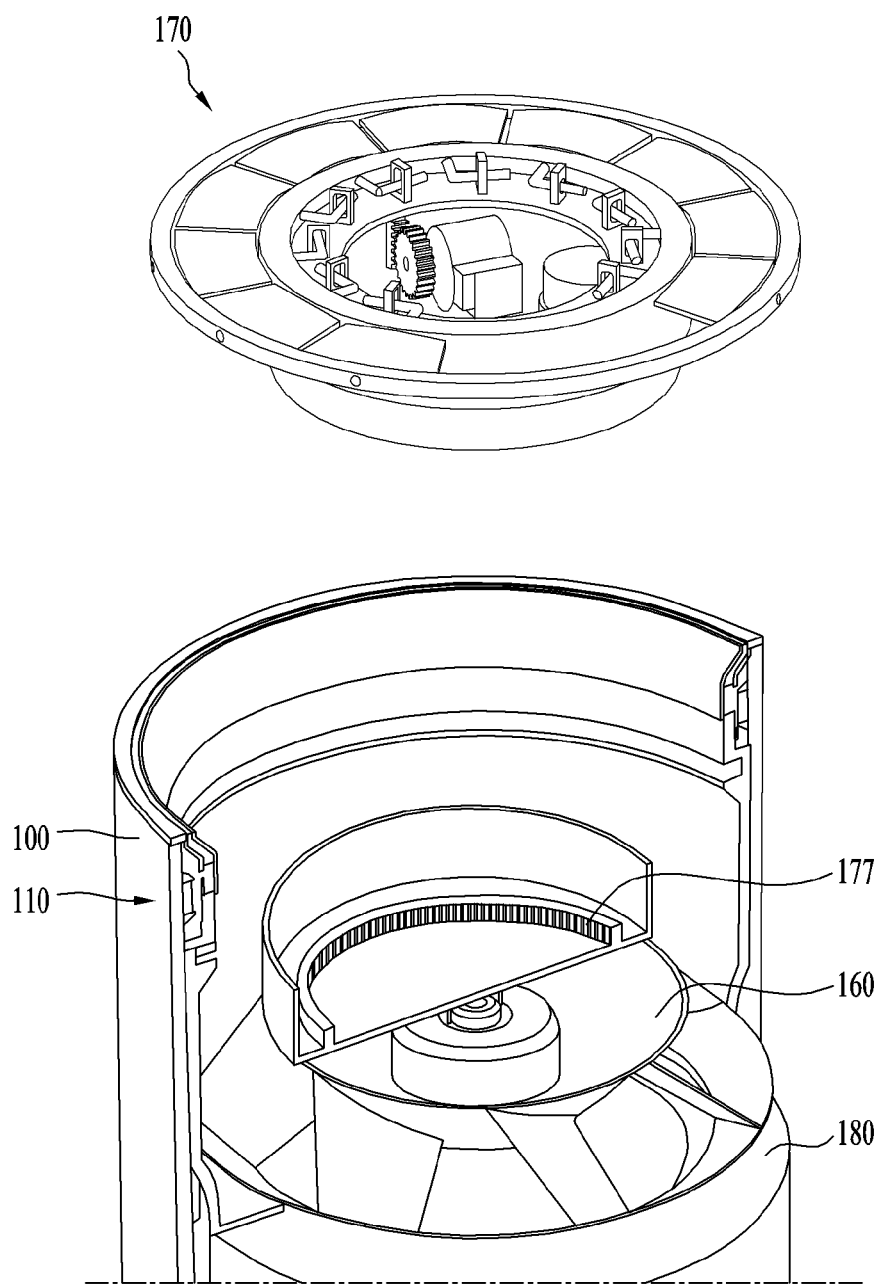

[Fig. 19]
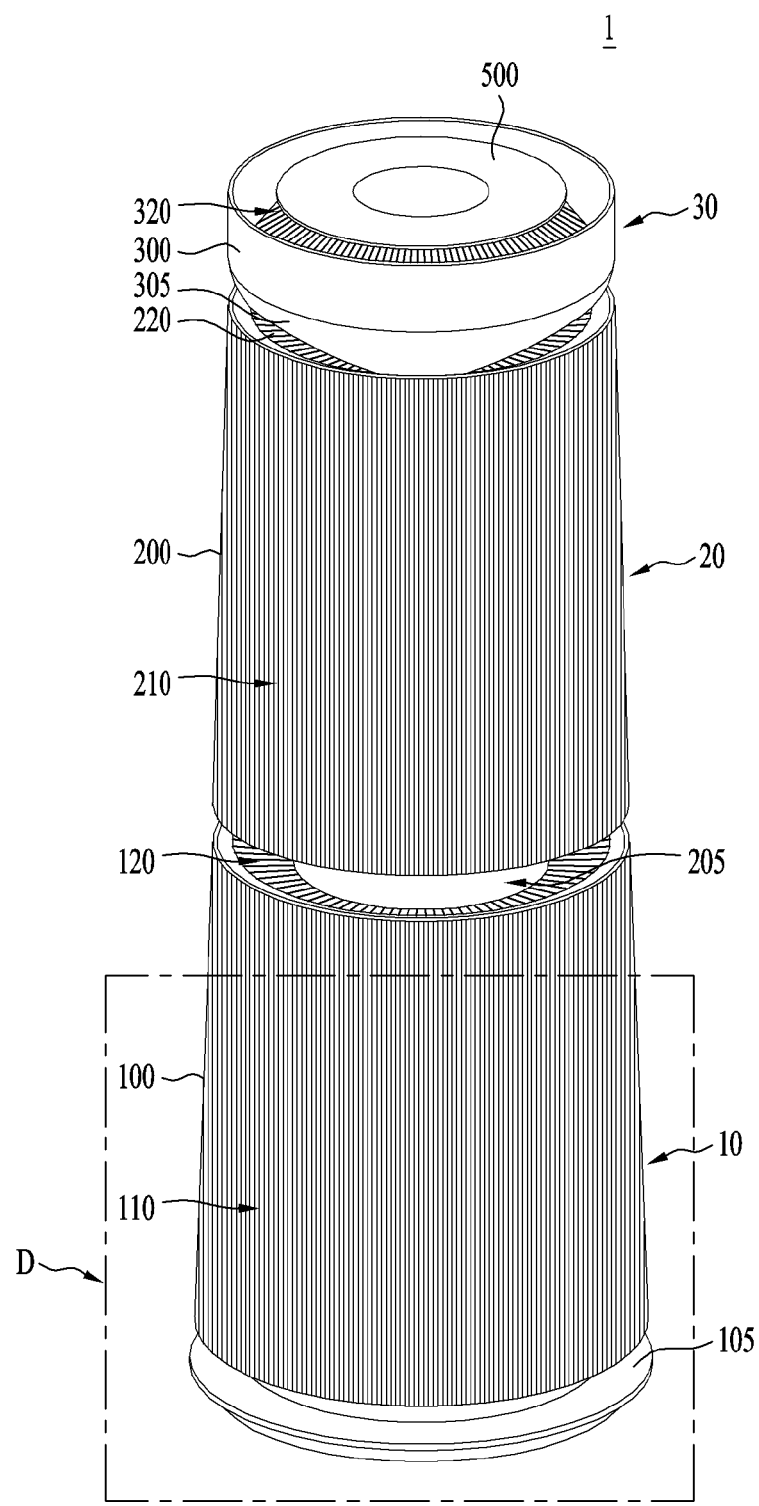

[Fig. 20]
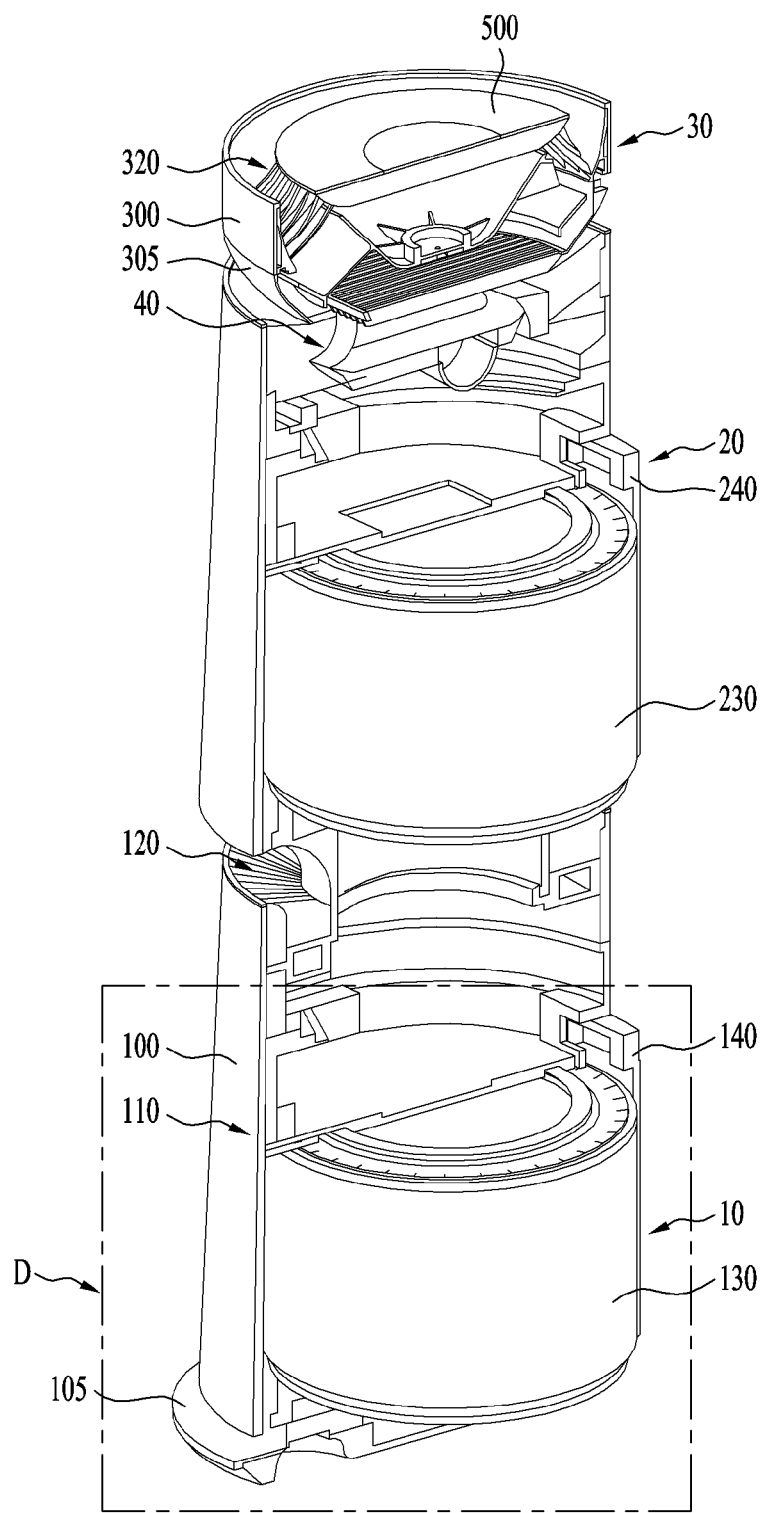

[Fig. 21]
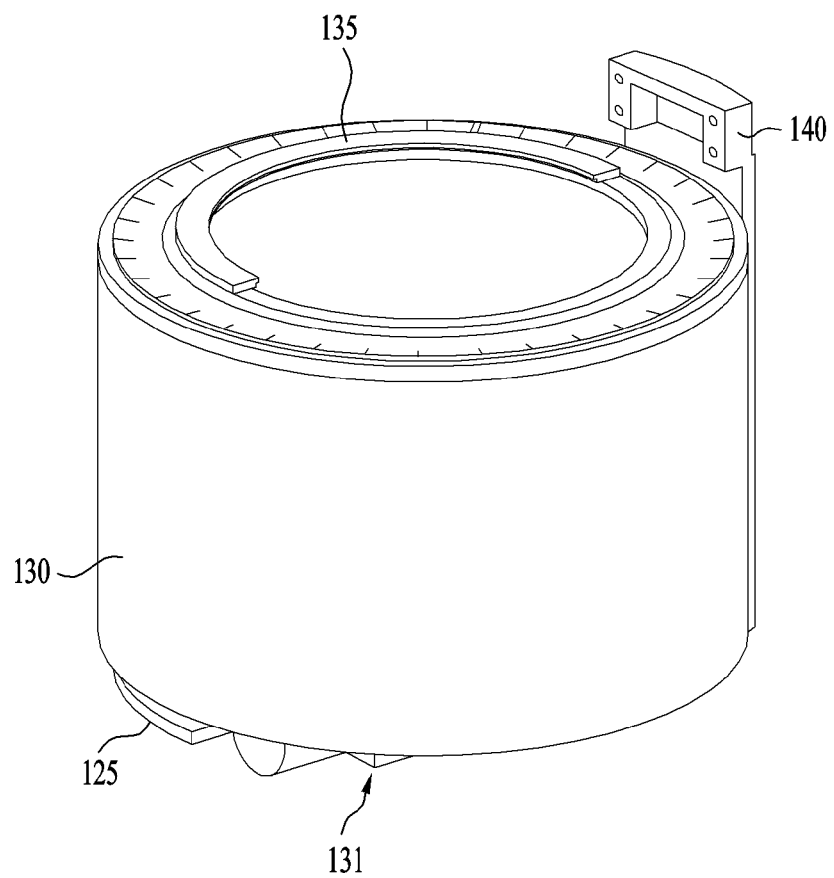

[Fig. 22]
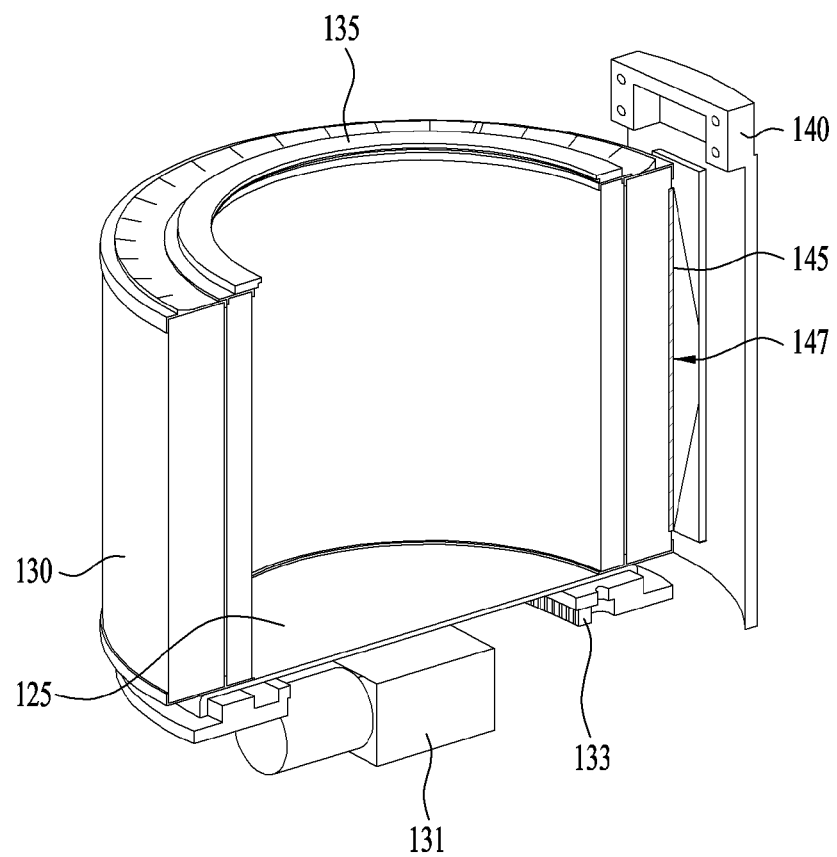

[Fig. 23]
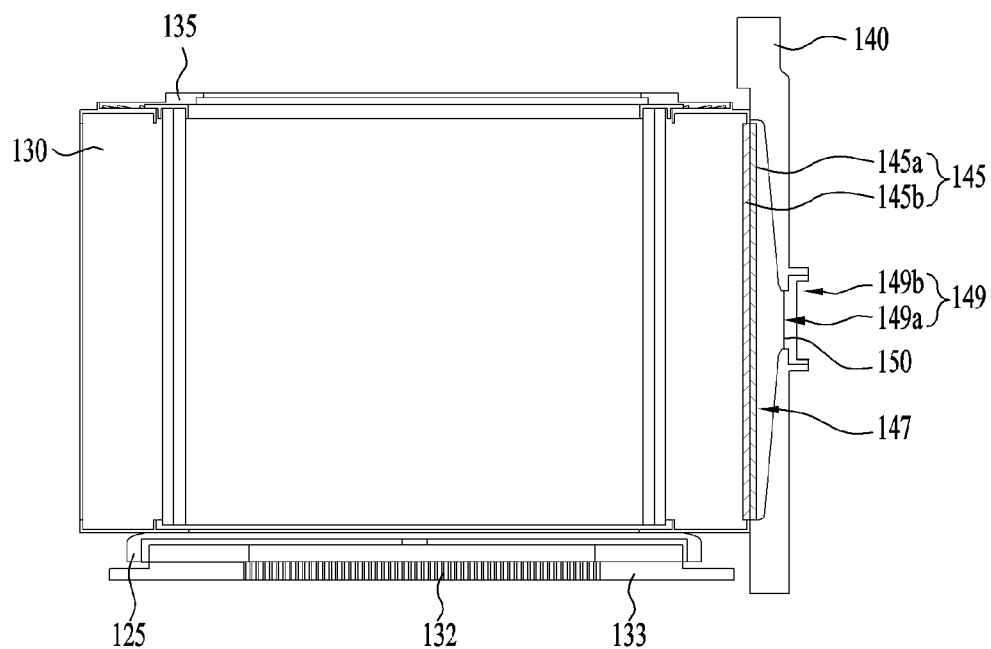
[Fig. 24]
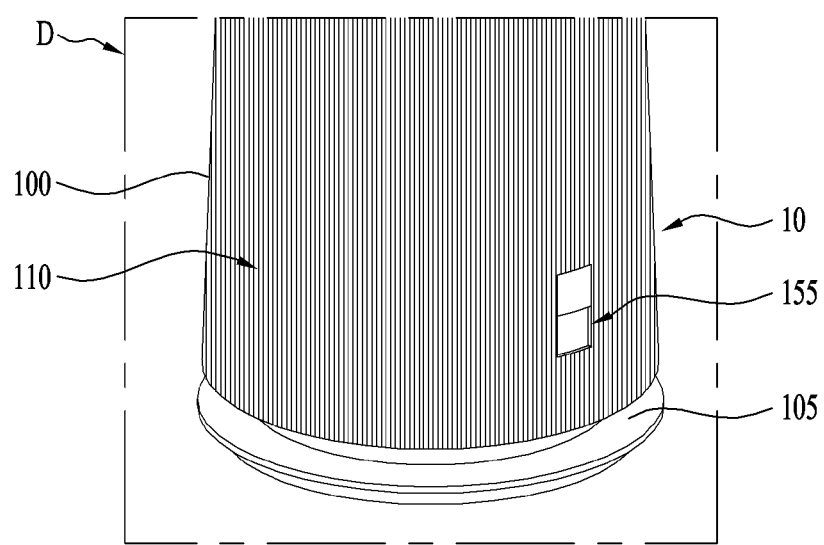

[Fig. 25]
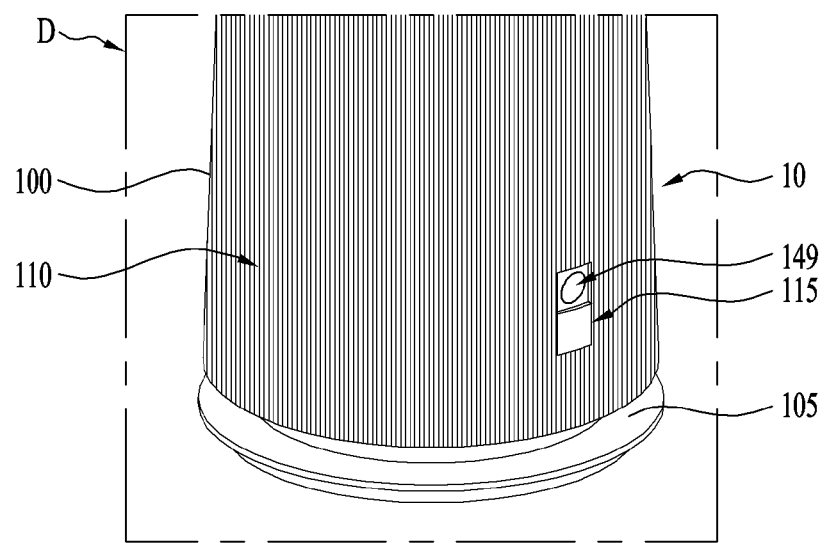
[Fig. 26]
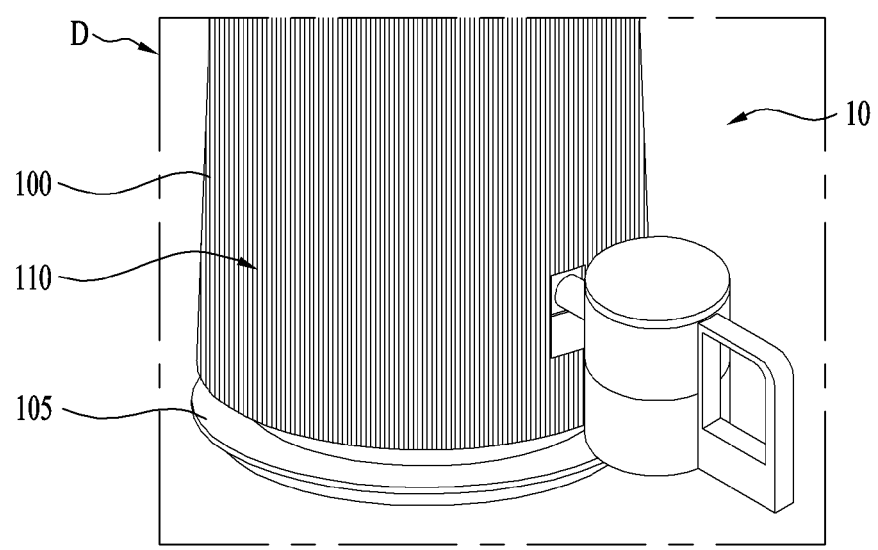

[Fig. 27]
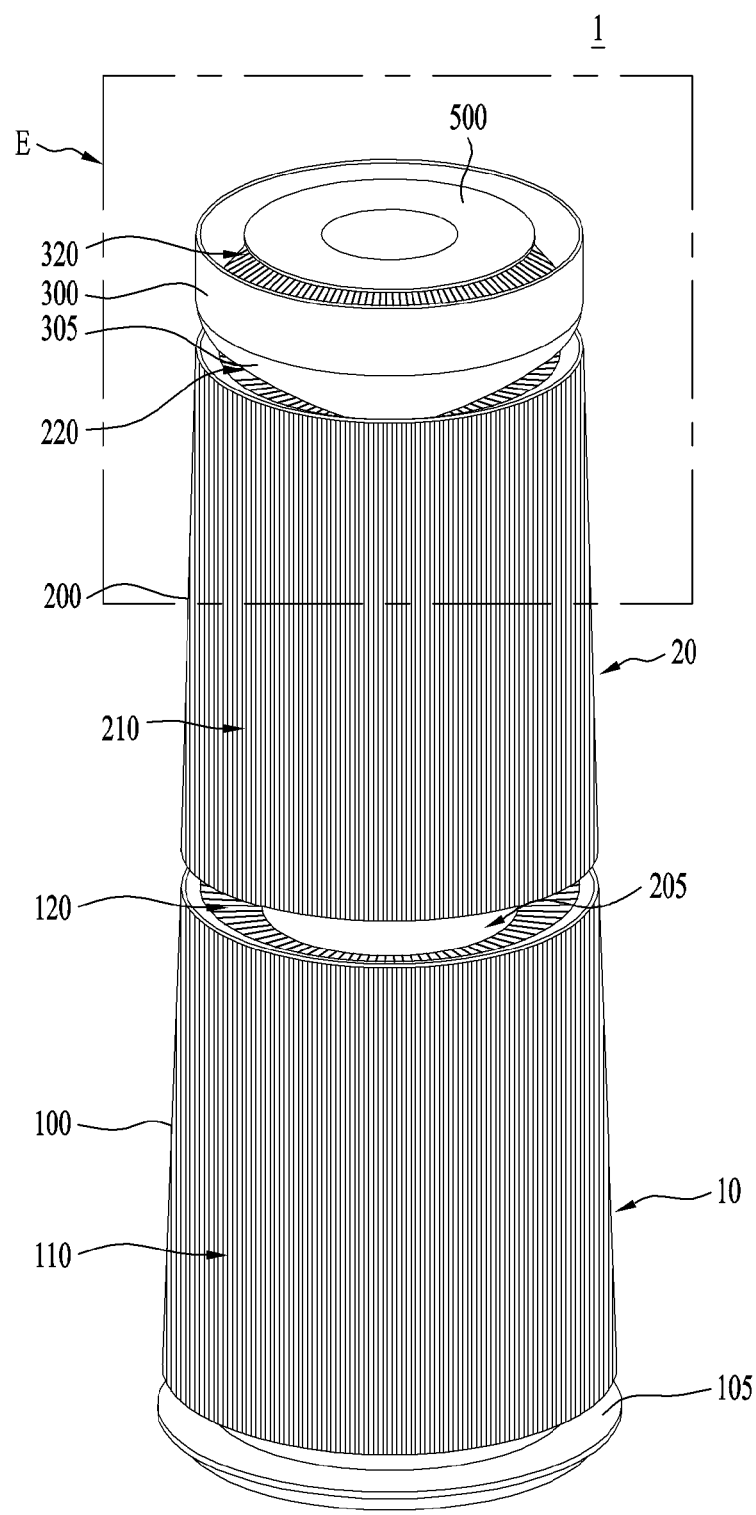

[Fig. 28]
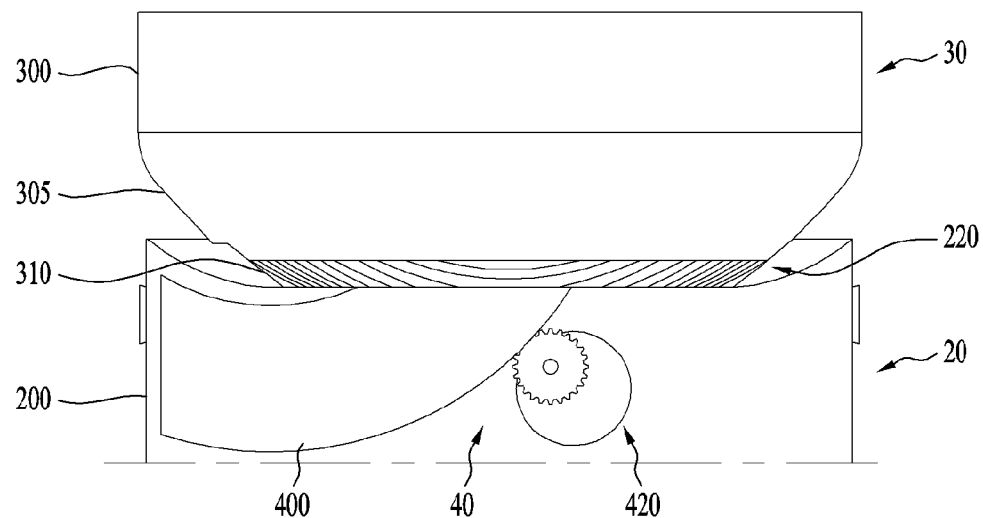

[Fig. 29]
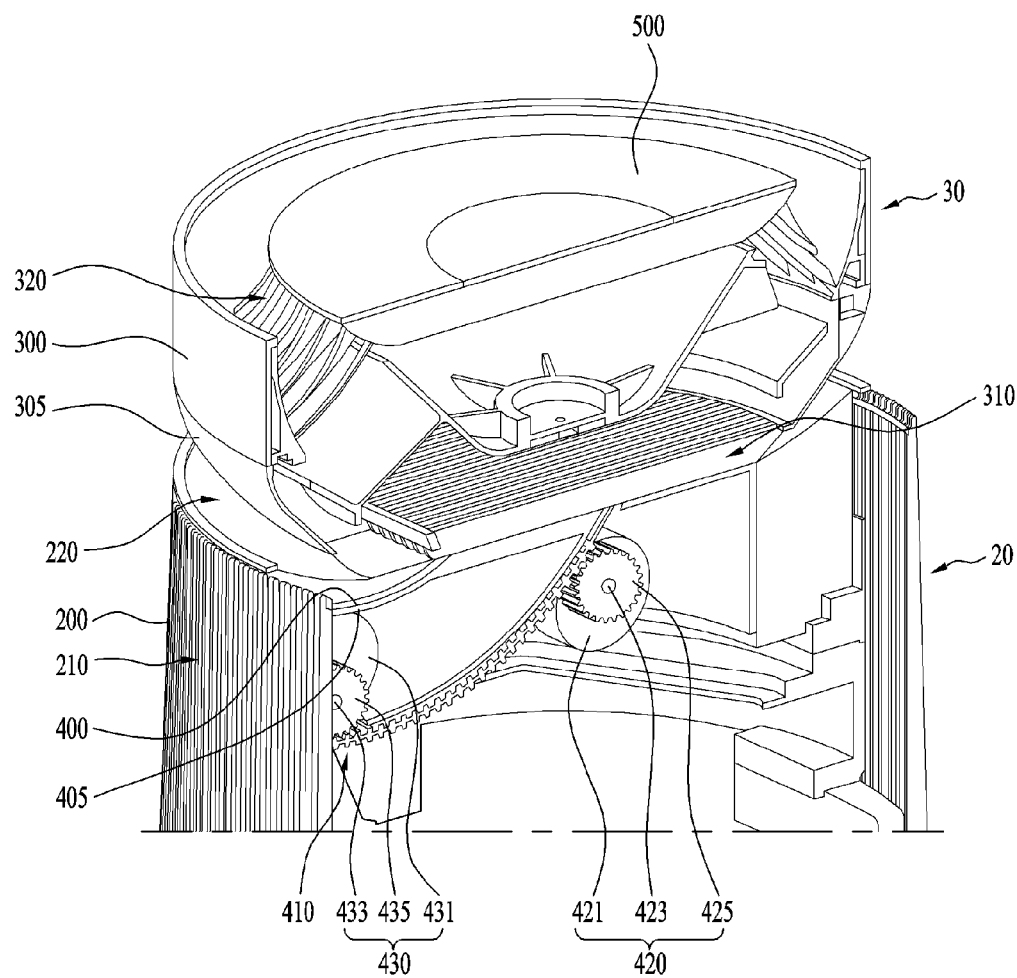

[Fig. 30]
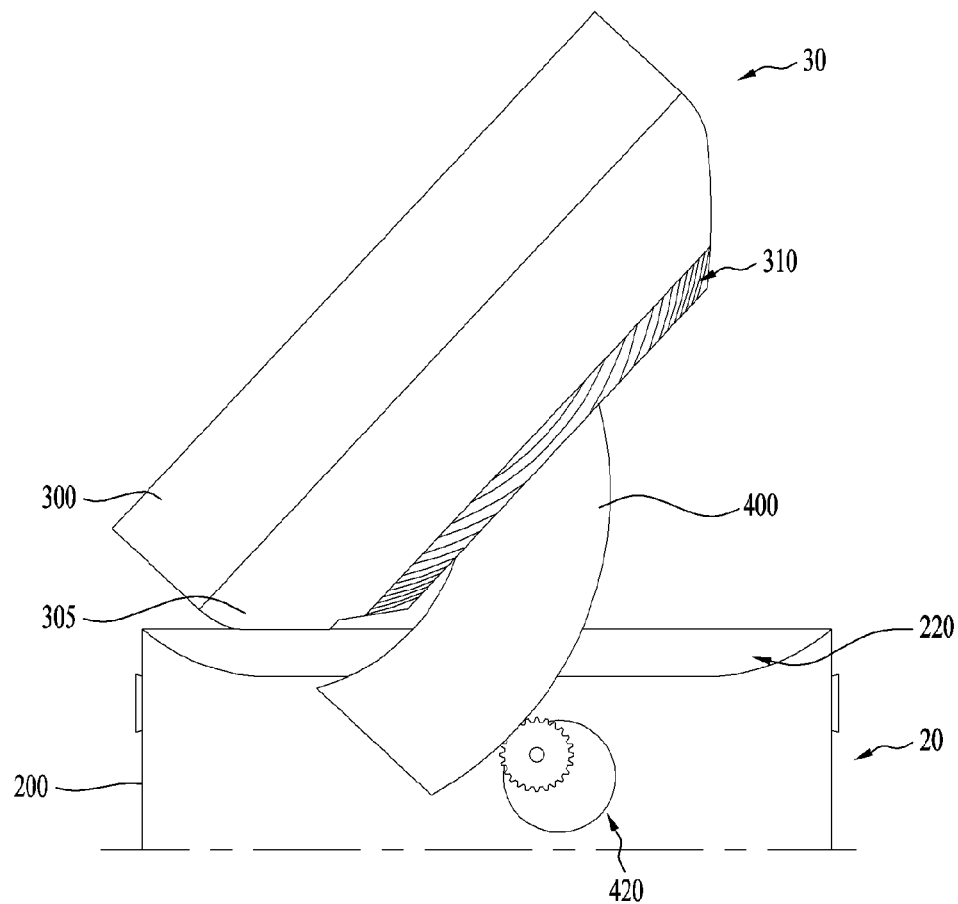

[Fig. 31]
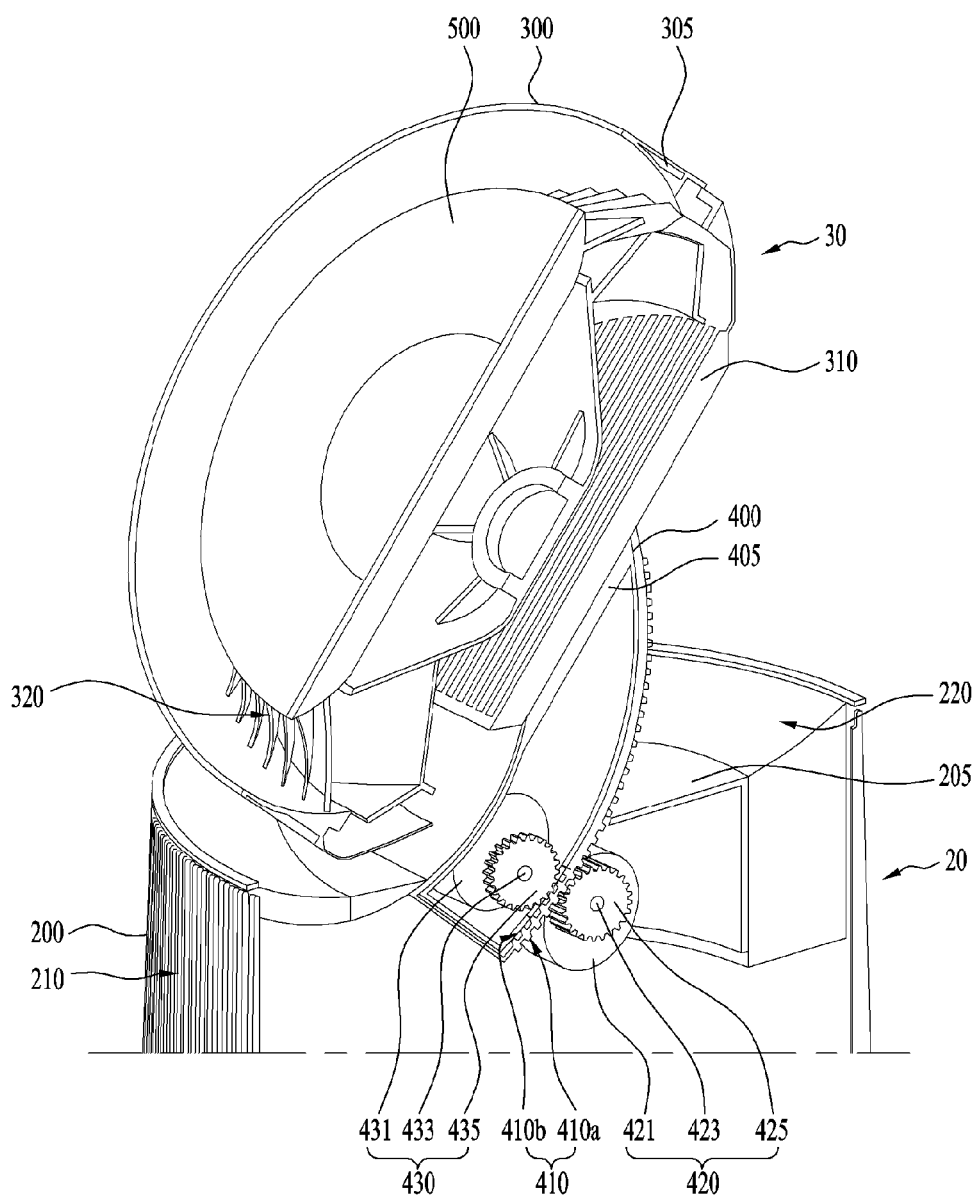

[Fig. 32]
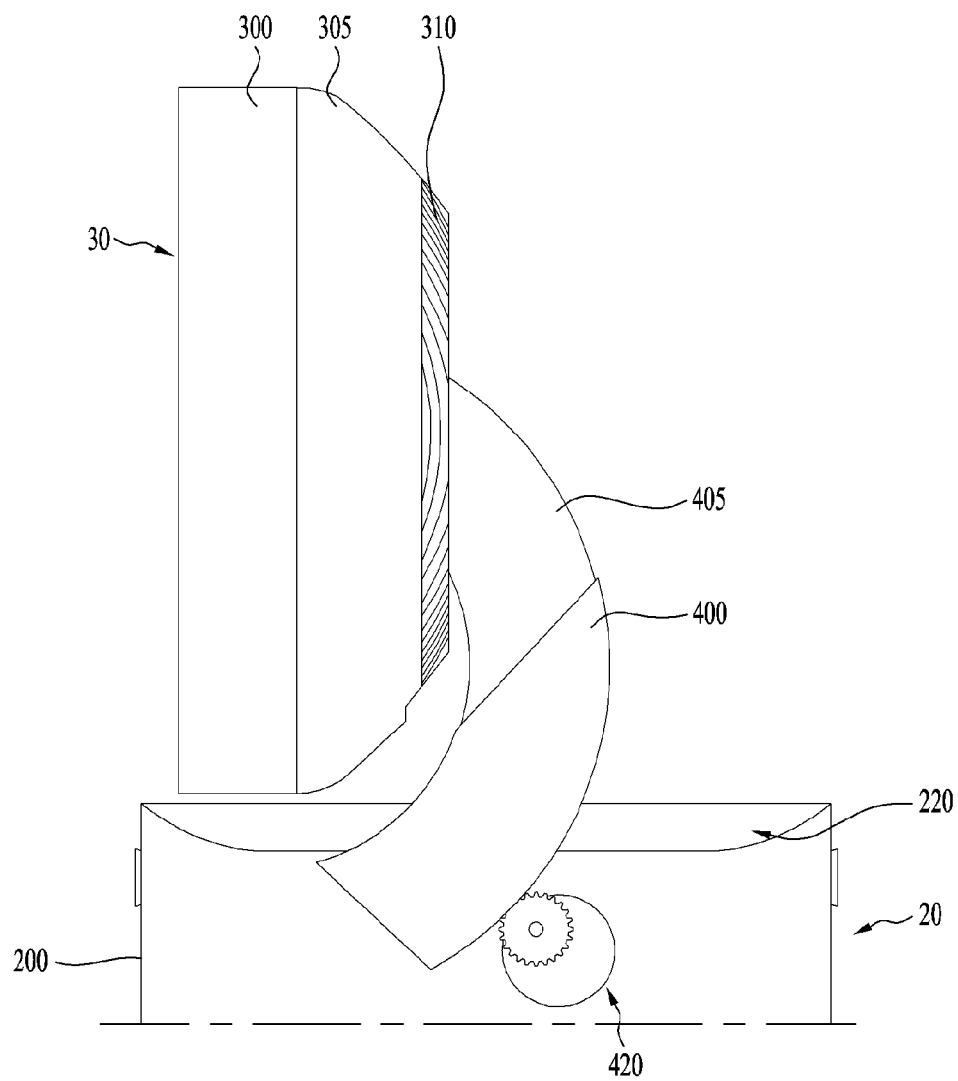

【Figure 33】
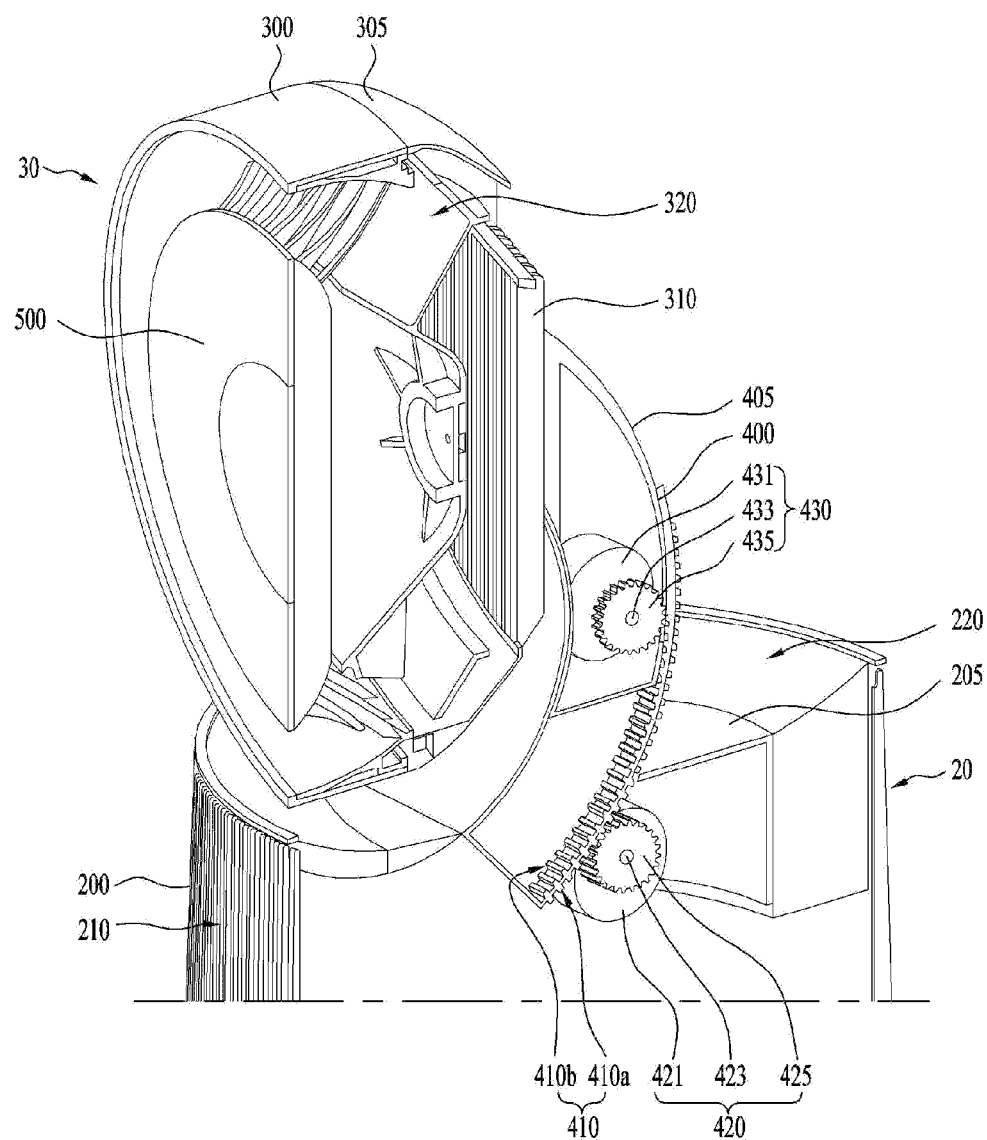

[Fig. 34]
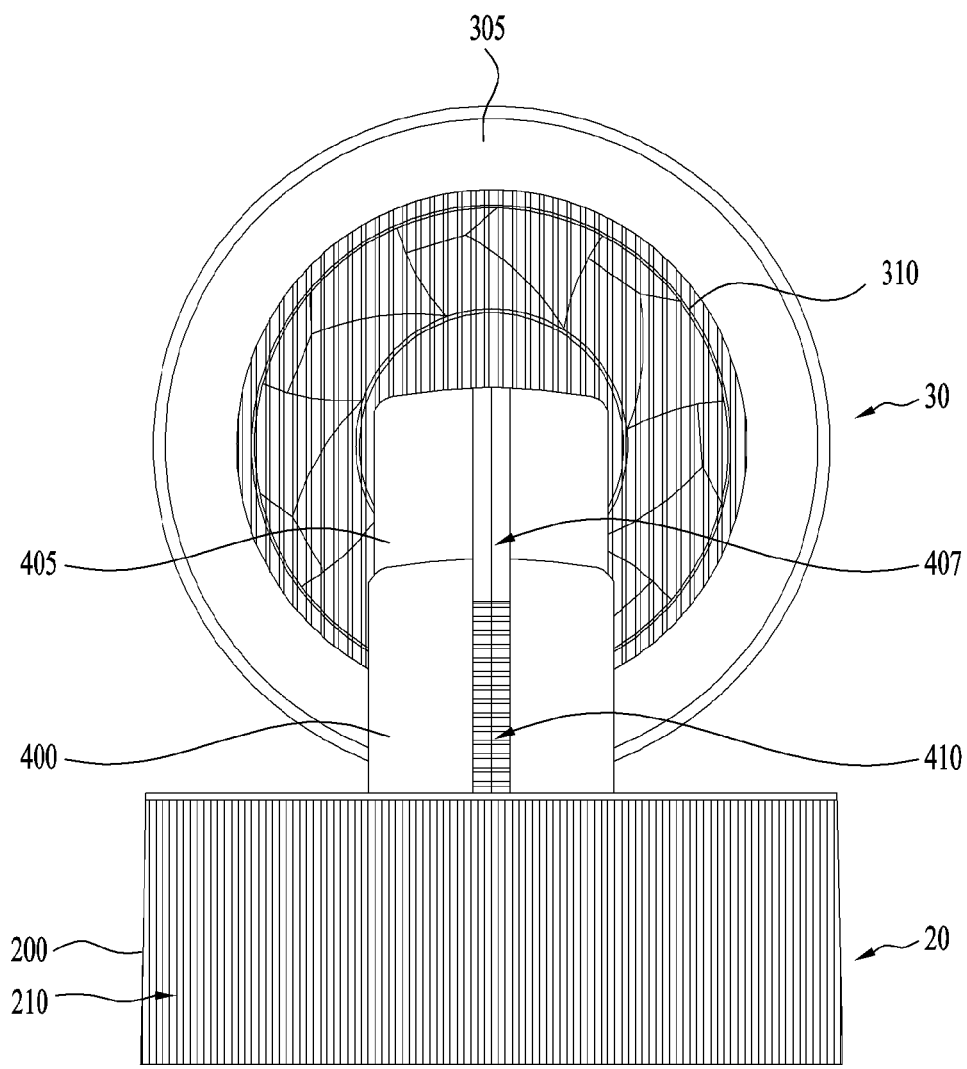

AIR CLEANER

CROSS REFERENCE TO RELATED APPLICATIONS

This application is the National Phase of PCT International Application No. PCT/KR2020/005836, filed on May 4, 2020, which claims priority under 35 U.S.C. 119(a) to Patent Application No. 10-2020-0039393, filed in the Republic of Korea on Mar. 31, 2020, all of which are hereby expressly incorporated by reference into the present application.

TECHNICAL FIELD

The present disclosure relates to an air cleaner.

BACKGROUND ART

The air cleaner is understood as a device that inhales and filters contaminated air into an interior thereof, and then discharges the filtered air to an outside. The air cleaner is configured to purify air in indoor spaces such as homes and offices. In general, the air cleaner includes a blower configured to inhale external air into an interior thereof and discharge the purified air, and a filter disposed in the interior of the blower to filter dust or bacteria in the air. In this connection, the air cleaner may further include a flow adjusting device configured to control a discharge direction of the air discharged from the blower. However, because a moving radius of the flow adjusting device is limited, air may not be discharged in a desired direction.

Prior art (Korean Patent Application Publication No. 10-2017-0101100, hereinafter, referred to as prior art 1) discloses an air cleaner further comprising a flow adjusting device configured to control a discharge direction of air discharged from a blower. According to the air cleaner of the prior art 1, air brought into the blower is filtered by a filter disposed in the interior of the blower and then discharged in a vertical direction perpendicular to an upper surface of the blower. Thereafter, the air discharged from the blower is blown in a direction other than the vertical direction via the flow adjusting device.

However, even with the air cleaner of the prior art 1, the air discharged from the blower is blown only in the vertical direction or in a direction forming a predefined angle with respect to the upper surface of the blower. The air may not be blown in a horizontal direction parallel to the upper surface.

Another prior art (Korean Patent Application Publication No. 10-2019-0120126, hereinafter, referred to as prior art 2) discloses an air cleaner including the flow adjusting device configured to control the discharge direction of the air discharged from the blower, and a rotating guide unit to induce rotation of the flow adjusting device. According to the air cleaner of the prior art 2, a position of the flow adjusting device may change according to an extent to which the rotating guide unit is withdrawn. The air discharged from the blower may be blown in a direction other than the vertical direction via the flow adjusting device depending on an extent to which the rotating guide unit is withdrawn.

However, even with the air cleaner of the prior art 2, a space in which the rotating guide unit is received in the blower is limited. Thus, a length of the rotating guide unit to change the state to allow an upper surface of the flow adjusting device to be perpendicular to an upper surface of the blower cannot be secured. Accordingly, there is a limit that it is difficult for the air discharged from the blower to be blown in a desired direction.

DISCLOSURE OF INVENTION

Technical Problem

One of various purposes of the present disclosure is to provide an air cleaner capable of discharging filtered air in a horizontal direction parallel to an upper surface of a blower.

Further, one of the various purposes of the present disclosure is to provide an air cleaner including a flow adjusting device that may change a position of an upper surface in a range from a horizontal position parallel to the upper surface of the blower to a direction perpendicular to the upper surface of the blower.

Solution to Problem

An air cleaner according to exemplary embodiments of the present disclosure may include sequentially stacked blowers, a guide member, and a flow adjusting device. The guide member may include an outer housing configured to retract into an interior of the blower or extend from an upper surface of the blower, and an inner housing configured to retract into an interior of the outer housing or to extend from the outer housing.

An air cleaner according to exemplary embodiments of the present disclosure may include a blower configured to inhale air from an outside, filter the inhaled air, and discharge the filtered air; a flow adjusting device disposed above the blower, wherein the flow adjusting device is configured to inhale the air discharged from the blower, adjust a discharge direction of the inhaled air and discharge the air therefrom to the outside in a adjusted direction; and a guide member having one end passing through an upper surface of the blower and received in the blower, and the other end connected to the flow adjusting device, wherein an angle defined between an upper surface of the flow adjusting device and the upper surface of the blower increases or decreases based on an extent to which the guide member extends from the upper surface of the blower, wherein the position of the flow adjusting device gradually changes from a position in which the upper surface of the flow adjusting device is parallel with the upper surface of the blower to a position in which the upper surface of the flow adjusting device is perpendicular to the upper surface of the blower.

The angle defined between the upper surface of the flow adjusting device and the upper surface of the blower increases or decreases primarily based on an extent to which the outer housing extends from the blower, and additionally increases or decreases secondarily based on an extent to which the inner housing extends from the outer housing.

The upper surface of the flow adjusting device may be oriented to be perpendicular to the upper surface of the blower. Thus, the air discharged from the blower may be blown to a greater distance through the flow adjusting device.

An air cleaner according to exemplary embodiments of the present disclosure may include a blower configured to inhale air from an outside, filter the inhaled air, and discharge the filtered air; a flow adjusting device disposed above the blower, wherein the flow adjusting device is configured to inhale the air discharged from the blower, adjust a discharge direction of the inhaled air and discharge the air therefrom to the outside in a adjusted direction; and a guide member having one end passing through an upper surface of the blower and received in the blower, and the other end connected to the flow adjusting device. The guide member is configured to retract into an interior of the blower or extend from the upper surface of the blower to induce position change of the flow adjusting device. The angle defined between the upper surface of the flow adjusting device and the upper surface of the blower increases or decreases primarily based on an extent to which the guide member extends from the blower.

The position of the flow adjusting device switches to between first to third positions, based on a movement of the guide member, wherein in the first position, the upper surface of the flow adjusting device is parallel with the upper surface of the blower, wherein in the second position, the upper surface of the flow adjusting device forms a predefined angle with respect to the upper surface of the blower, wherein in the third position, the upper surface of the flow adjusting device is perpendicular to the upper surface of the blower.

The guide member includes: an outer housing defining an appearance, and having one end received in an interior of the blower, wherein the outer housing configured to extend from the upper surface of the blower; and an inner housing having one end received in an interior of the outer housing and the other end connected to the flow adjusting device, wherein the inner housing is configured to extend from the other end of the outer housing, wherein the outer housing surrounds the inner housing.

While the flow adjusting device is oriented in the first position, the outer housing is entirely received in the interior of the blower and is not exposed to an outside. While the flow adjusting device is oriented in the second position, the outer housing at least partially extends from the blower and is exposed to the outside.

While the flow adjusting device is oriented in the second position, the inner housing is entirely received in the interior of the outer housing and is not exposed to the outside. While the flow adjusting device is oriented in the third position, the inner housing extends from the outer housing and is exposed to the outside.

The outer housing has a substantially curved pillar shape, wherein the inner housing has a pillar shape of a size relatively smaller than a size of the pillar shape of the outer housing, wherein the pillar shape of the outer housing has an open top face so that the inner housing retracts into an interior of the outer housing or extend from the open top face of the outer housing.

The angle defined between the upper surface of the flow adjusting device and the upper surface of the blower increases or decreases primarily based on an extent to which the outer housing extends from the blower, and additionally increases or decreases secondarily based on an extent to which the inner housing extends from the outer housing.

The outer housing includes: a first guide rail extending across an outer face of the outer housing in a longitudinal direction thereof; and a second guide rail extending across an inner face of the outer housing in the longitudinal direction, wherein the first guide rail and the second guide rail are formed in a central region in the longitudinal direction of the outer housing, and each of the first guide rail and the second guide rail is disposed to be opposite to each other.

The inner housing includes: a trench extending across an outer face of the inner housing in the longitudinal direction; and an opening passing through a portion of a region of the outer face of the inner housing corresponding to the trench, wherein the trench has a recessed shape in the outer face of the inner housing.

The opening is closer to one end of the inner housing received in an interior of the outer housing than to the other end of the inner housing connected to the flow adjusting device.

The guide member further includes: a first wheel disposed in an interior of the blower, and configured to rotate in engagement with the first guide rail; and a second wheel disposed in an interior of the inner housing, and configured to rotate in engagement with the second guide rail, wherein the second wheel is closer to one end of the inner housing received in the interior of the outer housing than to the other end of the inner housing connected to the flow adjusting device.

The second wheel is configured to be engaged with the second guide rail through the opening.

The second wheel is controlled not to rotate until the flow adjusting device is oriented in the second position, and is controlled to rotate only after the flow adjusting device is oriented in the second position.

The outer housing is controlled to retract into the interior of the blower or extend from the upper surface of the blower based on rotational movement of the first wheel, wherein the inner housing is controlled to retract into the interior of the outer housing or extend from the other end of the outer housing based on rotational movement of the second wheel.

The position of the flow adjusting device switches to between the first position and the second position based on the rotational movement of the first wheel, wherein the position of the flow adjusting device switches to between the second position and the third position based on the rotational movement of the second wheel.

The guide member further includes: a first motor disposed in the interior of the blower and having a rotatable first shaft; and a second motor disposed in the interior of the inner housing and having a rotatable second shaft, wherein the first wheel is coupled to the first shaft and is rotated via the first motor, wherein the second wheel is coupled to the second shaft and is rotated via the second motor.

The blower includes: a first blower configured to inhale first air present at a relatively low vertical level and filter and blow the first air; and a second blower configured to inhale second air present at a relatively high vertical level and filter and blow the second air, wherein the first blower includes: a first casing defining an appearance; a first filter member disposed in a lower portion of an interior of the first casing to filter air; and a first blow fan disposed in an upper portion of the interior of the first casing to generate air flow, wherein the second blower includes: a second casing defining an appearance; a second filter member disposed in a lower portion of an interior of the second casing to filter air; and a second blow fan disposed in an upper portion of the interior of the second casing to generate air flow, wherein the guide member is configured to be movable while passing through an upper surface of the second casing.

Advantageous Effects of Invention

In accordance with the present disclosure, an air cleaner includes a blower configured to inhale air from an outside, filter the inhaled air, and discharge the filtered air; a flow adjusting device disposed above the blower, wherein the flow adjusting device is configured to inhale the air discharged from the blower, adjust a discharge direction of the inhaled air and discharge the air therefrom to the outside in a adjusted direction; and a guide member having one end passing through an upper surface of the blower and received in the blower, and the other end connected to the flow adjusting device. The guide member is configured to retract into an interior of the blower or extend from the upper surface of the blower to induce position change of the flow adjusting device. The angle defined between the upper surface of the flow adjusting device and the upper surface of the blower increases or decreases primarily based on an extent to which the guide member extends from the blower.

The flow adjusting device may be oriented so that the upper surface thereof is perpendicular to the upper surface of the blower via the moment of the guide member. Thus, the air discharged from the blower may be discharged in a horizontal direction to the upper surface of the blower through the flow adjusting device.

The guide member may include an outer housing defining an appearance and an inner housing surrounded with the outer housing. The position of the flow adjusting device may be primarily changed as the outer housing extends from or retracts into the blower. Then, the position of the flow adjusting device may additionally change as the inner housing extends from or retracts into the outer housing.

In this connection, the guide member may be composed of the outer housing and the inner housing. Thus, the space occupied by the guide member in the interior of the blower may be reduced. Accordingly, there is no need to secure a large length of the guide member to change the position of the flow adjusting device such that the upper surface of the flow adjusting device is perpendicular to the upper surface of the blower. Therefore, limitation on the position change of the flow adjusting device as caused by a limit of the interior space of the blower occupied by the guide member may be removed.

BRIEF DESCRIPTION OF DRAWINGS

FIG. 1 to FIG. 4 are perspective views for illustrating an air cleaner according to exemplary embodiments of the present disclosure.

FIG. 5 to FIG. 8 are perspective views, a cross-sectional view, and a side elevation view for illustrating an air cleaner according to exemplary embodiments of the present disclosure.

FIG. 9 to FIG. 18 are perspective views, cross-sectional views, top views, and side elevation views for illustrating an air cleaner according to exemplary embodiments of the present disclosure.

FIG. 19 to FIG. 26 are perspective views and cross-sectional views for illustrating an air cleaner according to exemplary embodiments of the present disclosure.

FIG. 27 to FIG. 34 are perspective views, cross-sectional views and rear views for illustrating an air cleaner according to exemplary embodiments of the present disclosure.

MODE FOR THE INVENTION

Hereinafter, specific embodiments of the present disclosure will be described with reference to the drawings. The following detailed description is configured to aid in a comprehensive understanding of methods, devices and/or systems described herein. However, this is only an example, and the present disclosure is not limited thereto.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Hereinafter, a direction perpendicular to a ground is defined as a vertical direction. A direction parallel to the ground and perpendicular to the vertical direction is defined as a horizontal direction. A circumferential direction is defined as a virtual circular direction that is formed when an object rotates around the vertical direction at a rotation radius as a length of the horizontal direction.

FIG. 1 to FIG. 4 are perspective views for illustrating an air cleaner according to exemplary embodiments of the present disclosure. Specifically, FIG. 1 is a perspective view for illustrating an overall structure of the air cleaner. FIG. 2 to FIG. 4 are enlarged perspective views of an area A in FIG. 1. In this connection, FIG. 2 is a diagram for illustrating components of a flow adjusting device included in the air cleaner. FIG. 3 and FIG. 4 are diagrams for illustrating a cross-section of the flow adjusting device.

Referring to FIG. 1, an air cleaner 1 according to exemplary embodiments of the present disclosure may include a blower 10 and 20 configured to inhale air from the outside, and filter the inhaled air and discharge the filtered air, a flow adjusting device 30 disposed above the blower 10 and 20 and configured to inhale the air discharged from the blower 10 and 20, and control the discharge direction of the inhaled air, and a guide member 40 disposed between the blower 10 and 20 and the flow adjusting device 30, wherein one end thereof is connected to the blower 10 and 20 and the other end is connected to the flow adjusting device 30, wherein the guide member 40 is configured to induce a position change of the flow adjusting device 30.

The blower 10 and 20 includes a first blower 10 configured to inhale, filter and blow air at a relatively low vertical level, and a second blower 20 disposed above the first blower 10 and configured to inhale, filter, and blow air at a relatively high vertical level. The first blower 10 and the second blower 20 may be stacked in the vertical direction, and may be fastened to each other via a variety of manners, such as fitting fastening, rivet fastening, and screw fastening.

The flow adjusting device 30 may be disposed above the second blower 20. The guide member 40 may be configured to be connected to the second blower 20 and the flow adjusting device 30. The guide member 40 and the second blower 20 may be fastened to each other via a variety of methods, such as fitting fastening, rivet fastening, and screw fastening. The guide member 40 and the flow adjusting device 30 may be fastened to each other via various methods such as fitting fastening, rivet fastening, and screw fastening.

In one example, FIG. 1 shows that the blower 10 and 20 include the first blower 10 and the second blower 20 sequentially stacked along the vertical direction. However, a concept of the present disclosure is not necessarily limited thereto. A blower may include only one blower.

The first blower 10 may include a first casing 100 that defines appearance of the blower, a first filter member 130 disposed in a lower portion of an interior of the first casing 100 to filter air, and a first blow fan 160 disposed in an upper portion of the interior of the first casing 100 to generate air flow. The second blower 20 includes a second casing 200 that defines the appearance, a second filter member 230 disposed in a lower portion of an interior of the second casing 200, and a second blow fan 260 disposed in an upper portion of the interior of the second casing 200 to generate air flow.

In exemplary embodiments, each of the first casing 100 and the second casing 200 may have a truncated conical shape, or a cylinder shape having a diameter that gradually decreases as it extends upwardly.

The first blower 10 may further include a first base 105 disposed in the lower portion of the first blower 10. The first base 105 may be disposed on a ground and configured to support the first blower 10. The first base 105 may include a lower portion configured to contact the ground and an upper portion extending in the vertical direction from the lower portion and at least partially covered by the first casing 100. In one example, although not shown, a first lower inhale hole communicating with the interior of the first blower 10 may be further disposed in a space between an inner wall of the first casing 100 and the upper portion of the first base 105. Accordingly, outside air may be inhaled into the interior of the first blower 10 through the first lower inhale hole.

The second blower 20 may further include a second base 205 disposed in the lower portion of the first blower 20. The second base 105 may be disposed on the first blower 10 and configured to support the second blower 20. The second base 205 may include a lower portion configured to contact the first blower 10 and an upper portion extending in the vertical direction from the lower portion and at least partially covered by the second casing 200. In one example, although not shown, a second lower inhale hole communicating with the interior of the second blower 20 may be disposed in a space between an inner wall of the second casing 100 and the upper portion of the second base 205, Accordingly, outside air may be inhaled into the interior of the second blower 20 through the second lower inhale hole.

In a side wall of the first casing 100, a first inhale hole 110 configured to inhale air from the outside may be defined. The first inhale hole 110 may include a plurality of through-holes passing through at least a portion of the first casing 100. Further, in a side wall of the second casing 200, a second inhale hole 210 configured to inhale air from the outside may be defined. The second inhale hole 210 may include a plurality of through-holes passing through at least a portion of the second casing 100.

The first inhale hole 110 may be configured to have a line shape extending from a bottom to a top of the first casing 100. A plurality of first inhale holes 110 may be defined in the side wall of the first casing 100. The plurality of first inhale holes 110 may be evenly arranged in the circumferential direction along an outer circumferential surface of the first casing 100 to enable the air inhale in any direction around the first casing 100. Further, the second inhale hole 210 may be configured to have a line shape extending from a bottom to a top of the second casing 200. A plurality of second inhale holes 210 may be defined in the side wall of the second casing 200. The plurality of second inhale holes 210 may be evenly arranged in the circumferential direction along the outer circumferential surface of the second casing 100 to enable air inhale in any direction around the second casing 200.

A first discharge hole 120 configured to discharge air to the outside may be defined in the upper surface of the first blower 10. The first discharge hole 120 may include a plurality of through-holes passing through at least a portion of the upper surface of the first blower 10. Further, a second discharge hole 220 configured to discharge air to the outside may be defined in an upper surface of the second blower 20. The second discharge hole 220 may include a plurality of through-holes passing through at least a portion of an upper surface of the second blower 20.

The first discharge hole 120 may be configured to have a line shape extending from a distal portion of the upper surface of the first blower 10 to a portion adjacent to a central region thereof. The plurality of first discharge holes 120 may be defined in the upper surface of the first blower 10. The plurality of first discharge holes 120 may be evenly arranged to surround a portion of the upper surface of the first blower 10 other than a portion in which the second base 205 is disposed. Further, the second discharge hole 220 may be configured to have a line shape extending from the distal portion of the upper surface of the second blower 20 to a portion adjacent to a central region thereof. The plurality of second discharge holes 220 may defined in the upper surface of the second blower 20. The plurality of second discharge holes 220 may be evenly arranged to surround a portion of the upper surface of the second blower 20 other than a portion in which the guide member 40 is disposed.

In exemplary embodiments, when viewed from above, a collection of the plurality of first discharge holes 120 may form a ring shape covering an outer peripheral region of the upper surface of the first blower 10. A collection of the plurality of second discharge holes 220 may form a ring shape covering an outer peripheral region of the upper surface of the second blower 20. In one embodiment, the ring shape defined by the collection of the plurality of first discharge holes 110 may have an outer portion having a higher vertical level than an inner portion thereof. The ring shape defined by the collection of the plurality of second discharge holes 210 may have an outer portion having a higher vertical level than an inner portion thereof.

The upper surface of the first blower 10 may include an outer peripheral region in which the plurality of first discharge holes 120 are disposed and a central region in which the second base 205 is disposed. The upper surface of the second blower 20 may include an outer peripheral region in which the plurality of second discharge holes 220 are disposed and a central region in which the guide member 40 is disposed. In this connection, the central region of the upper surface of the first blower 10 may have a lower vertical level than the outer peripheral region thereof. The central region of the upper surface of the second blower 20 may have a lower vertical level than the outer peripheral region thereof.

Hereinafter, the upper surface of the first blower 10 is defined to refer only to the central region in which the second base 205 is disposed, except the outer peripheral region in which the plurality of first discharge holes 120 are disposed. The upper surface of the second blower 20 is defined to refer only to the central region in which the guide member 40 is disposed, except the outer peripheral region in which the plurality of second discharge holes 220 are disposed. In exemplary embodiments, each of the upper surface of the first blower 10 and the upper surface of the second blower 20 may have a flat surface extending in the horizontal direction.

The flow adjusting device 30 may include a rear casing which forms an appearance and is configured to define a rear face of the flow adjusting device 30, and which includes an inhale grill 310 configured to inhale air discharged from the blower 10 and 20. The inhale grill 310 may be referred to as an inhale port 310. The flow adjusting device 30 may include a front casing 300 fastened to the rear casing and configured to define a front face of the flow adjusting device 30. The front casing 300 may include a discharge grill 320 configured to discharge air inhaled through the inhale grill 310. The discharge grill 320 may be referred to as a discharge port 320. The rear casing includes a rear panel 310 defining the rear face of the flow adjusting device 30, and a side panel 305 extending from the rear panel 310 to the front casing 300 to define a side face of the flow adjusting device 30. The rear panel 310 of the rear casing 300 may be configured to perform the role of the inhale grill 310. That is, a combination of the side panel 305 and the rear panel 310 may form the rear casing 300. The front casing 300 and the rear casing may be collectively referred to as the casing.

The guide member 40 may have various structures to induce the position change of the flow adjusting device 30. For example, in FIG. 1, one end of guide member 40 is connected to the upper surface of second blower 20, the other end thereof is connected to the flow adjusting device 30, and the position change of the flow adjusting device 30 is induced as the other end of the guide member 40 is ascending or descending. However, the concept of the present disclosure is not necessarily limited thereto. That is, the guide member 40 may be controlled to retract into the interior of the blower 10 and 20 or to extend from the upper surface of the blower 10 and 20. A detailed description thereof will be made later with reference to FIG. 27 to FIG. 34.

In exemplary embodiments, based on the operation of the guide member 40, the flow adjusting device 30 may be oriented in a first position at which the upper surface of the flow adjusting device 30 is parallel with the upper surface of the second blower 20, may be oriented in a second position in which the upper surface of the flow adjusting device 30 has a predefined angle with respect to the upper surface of the second blower 20, and may be oriented in a third position in which the upper surface of the flow adjusting device 30 is perpendicular to the upper surface of the second blower 20.

FIG. 1 shows that the flow adjusting device 30 is oriented in the third position. A detailed description of a configuration in which the flow adjusting device 30 is oriented in the first position and the second position will be described later with reference to FIG. 27 to FIG. 34.

Referring to FIG. 2, the flow adjusting device 30 may include a front casing 300 defining a front face of the flow adjusting device 30, and a side panel 305 defining a side face of the flow adjusting device 30 to prevent air from entering the casing from outside, a rear panel 310 that defines a rear face of the flow adjusting device 30 and performs a role of an inhale grill 310, a blow fan 360 disposed between the front casing 300 and the rear panel 310 to blow inhaled air through the rear panel 310 toward the discharge grill 320, and a third filter member 350 configured to be seated on an inner face of the rear panel 310 and disposed between the blow fan 360 and the rear panel 310 to filter inhaled air through the inhale grill 310.

A display 500 configured to display operation information of the air cleaner 1 may be disposed on the upper surface of the flow adjusting device 30. The flow adjusting device 30 and the display 500 may be configured to work together. In exemplary embodiments, the display 500 may be configured to partially or entirely cover an upper surface of the flow adjusting device 30.

The upper surface of the flow adjusting device 30 and a side wall of the front casing 300 may be configured to be spaced apart from each other. The discharge grill 320 may be disposed in a space between the upper surface of the flow adjusting device 30 and the side wall of the front casing 300 to discharge air to the outside. The discharge grill 320 may have a structure surrounding the upper surface of the flow adjusting device 30 when viewed from above. Accordingly, the air inhale may be executed in any direction around the upper surface of the flow adjusting device 30. In exemplary embodiments, one side of the discharge grill 320 may be connected to the upper surface of the flow adjusting device 30, while the other side of the discharge grill 320 may be connected to the inner wall of the front casing 300.

In exemplary embodiments, while the flow adjusting device 30 is oriented in the first position, one side of the discharge grill 320 and the other side of the discharge grill 320 may be disposed at different vertical levels. In one embodiment, while the flow adjusting device 30 is oriented in the first position, one side of the discharge grill 320 may be present at a higher level than the other side of the discharge grill 320.

The front casing 300 and the rear casing may be fastened to each other at tops thereof via first hook fastening, and may be fastened to each other at bottoms thereof via second hook fastening.

Specifically, the top portion of the side panel 305 may be configured to include a first hook 333. The top portion of the front casing 300 may be configured to include a first counterpart hook 335. The top portion of the side panel 305 and the top portion of the front casing 300 may be fastened to each other via fastening between the first hook 333 and the first counterpart hook 335. Further, the bottom portion of the side panel 305 may be configured to include a pair of second counterpart hooks 345 symmetrical to each other in the horizontal direction. The bottom portion of the front casing 300 may be configured to include a pair of second hooks 343 disposed at positions corresponding to the second counterpart hooks, respectively. The bottom portion of the side panel 305 and the bottom portion of the front casing 300 may be fastened to each other via fastening between the second counterpart hooks 345 and second hooks 343. In one embodiment, the bottom portion of the side panel 305 may be configured to further include a magnet (not shown). The bottom portion of the front casing 300 may be configured to further include a magnet counterpart (not shown) made of metal. The coupling between the bottom portion of the side panel 305 and the bottom portion of the front casing 300 may be guided via the coupling between the magnet and the magnet counterpart.

Referring to FIG. 3, the third filter member 350 may be disposed on the seat 340 at the boundary between the rear panel 310 and the side panel 305.

The seat 340 may have a protruding shape toward the front casing rather than the rear panel, and may be configured to surround the edge of the rear panel 310.

In exemplary embodiments, the inner surface of the rear panel 310 and the filter member 350 may contact each other, and may be configured to have the same area as each other.

Referring to FIG. 4, the rear casing of the flow adjusting device 30 may be configured to be detachable when the flow adjusting device 30 is oriented in the third position. The filter member 350 may be configured to be detachable from the flow adjusting device 30 when the rear casing is separated from the front casing 300.

Specifically, in a state in which the flow adjusting device 30 is oriented in the third position, that is, in a state in which the upper surface of the flow adjusting device 30 is oriented to be perpendicular to the upper surface of the second blower 20, the fastening between the first hook 333 and the first counterpart hook 335 is released, such that the top of the side panel 305 and the top of the front casing 300 may be separated from each other. Then, as the fastening between the second counterpart hook 345 and the second hook 343 is released, the bottom portion of the side panel 305 and the bottom portion of the upper casing 300 may be separated from each other. In one example, when the bottom portion of the side panel 305 and the bottom portion of the upper casing 300 further include the magnet and the magnet counterpart, respectively. In this case, before the fastening between the second counterpart hook 345 and the second hook 343 is released, the fastening between the magnet and the magnet counterpart is released, such that separation between the bottom portion of the side panel 305 and the bottom portion of the upper casing 300 may be induced.

In exemplary embodiments, the first filter member 130 and the second filter member 230 may be composed of the same filter as each other. The third filter 350 may be composed of a different filter from the first filter member 130 and the second filter member 230. In one embodiment, the first filter member 130 and the second filter member 230 may be composed of HEPA filters, respectively. The third filter member 350 may be embodied as a pre-filter.

As described above, the air discharged from the blower 10 and 20 after the air is filtered by the first filter member 130 and/or the second filter member 230 passes through the rear panel 310 of the flow adjusting device 30 and is inhaled into the interior of the flow adjusting device 30. A foreign-substance included in the air may be further filtered while passing through the third filter member 350 contacting the inner surface of the rear panel 310. The third blow fan 360 disposed in the interior of the flow adjusting device 30 and the discharge grill 320 disposed in the front casing 300 of the flow adjusting device 30 may blow and discharge air in which the foreign-substance is additionally filtered. Accordingly, the interior of the flow adjusting device 30 may have the foreign-substance in a small amount due to the third filter member 350, such that the cleaning cycle of the interior of the flow adjusting device 30 may be lengthened.

In one example, the rear casing, that is, the side panel 305 and the rear panel 310 may be easily separated from the front casing 300 via releasing of the first hook fastening and the second hook fastening, respectively. Accordingly, the interior cleaning of the flow adjusting device 30 may be effectively performed.

Further, the rear panel 310 serving as an inhale grill 310 to inhale air, and the third filter member 350 seated on the inner surface of the rear panel 310 may be individually washed after the rear casing is separated from the front casing 300. Accordingly, maintenance of the flow adjusting device 30 may be easily performed.

FIG. 5 to FIG. 8 are perspective views, a cross-sectional view, and a side elevation view for illustrating the air cleaner according to exemplary embodiments of the present disclosure. Specifically, FIG. 5 is a perspective view for illustrating the overall structure of the air cleaner. FIG. 6 is an enlarged perspective view of an area B in FIG. 5. FIG. 7 is a cross-sectional view illustrating an inner structure of a second blower and a flow adjusting device included in the air cleaner. FIG. 8 is a side elevation view to illustrate an outer structure of the second blower and the flow adjusting device. In this connection, FIG. 6 is a diagram for illustrating cross sections of the second blower and the flow adjusting device.

The air cleaner as described with reference to FIG. 5 to FIG. 8 is substantially the same or similar to the air cleaner as described with reference to FIG. 1 to FIG. 4. Thus, the same reference numerals are used for the same components. Detailed description of the same components will be omitted.

Referring to FIG. 5, the air cleaner 1 according to exemplary embodiments of the present disclosure may include the sequentially stacked blowers 10 and 20, the guide member 40, and the flow adjusting device 30. In this connection, the blower 10 and 20 may include the first blower 10 configured to inhale, filter and blow air at a relatively low vertical level, and the second blower 20 disposed above the first blower 10 and configured to inhale, filter and blow air at a relatively high vertical level.

The first blower 10 may include a first casing 100 that defines appearance of the blower, a first filter member 130 disposed in a lower portion of an interior of the first casing 100 to filter air, and a first blow fan 160 disposed in an upper portion of the interior of the first casing 100 to generate air flow. The second blower 20 includes a second casing 200 that defines the appearance, a second filter member 230 disposed in a lower portion of an interior of the second casing 200, and a second blow fan 260 disposed in an upper portion of the interior of the second casing 200 to generate air flow.

In a side wall of the first casing 100, a first inhale hole 110 configured to inhale air from the outside may be defined. The first inhale hole 110 may include a plurality of through-holes passing through at least a portion of the first casing 100. Further, in a side wall of the second casing 200, a second inhale hole 210 configured to inhale air from the outside may be defined. The second inhale hole 210 may include a plurality of through-holes passing through at least a portion of the second casing 100. The first inhale hole 110 may be configured to have a line shape extending from a bottom to a top of the first casing 100. A plurality of first inhale holes 110 may be defined in the side wall of the first casing 100. The plurality of first inhale holes 110 may be evenly arranged in the circumferential direction along an outer circumferential surface of the first casing 100 to enable the air inhale in any direction around the first casing 100. Further, the second inhale hole 210 may be configured to have a line shape extending from a bottom to a top of the second casing 200. A plurality of second inhale holes 210 may be defined in the side wall of the second casing 200. The plurality of second inhale holes 210 may be evenly arranged in the circumferential direction along the outer circumferential surface of the second casing 100 to enable air inhale in any direction around the second casing 200.

A first discharge hole 120 configured to discharge air to the outside may be defined in the upper surface of the first blower 10. The first discharge hole 120 may include a plurality of through-holes passing through at least a portion of the upper surface of the first blower 10. Further, a second discharge hole 220 configured to discharge air to the outside may be defined in an upper surface of the second blower 20. The second discharge hole 220 may include a plurality of through-holes passing through at least a portion of an upper surface of the second blower 20.

The first discharge hole 120 may be configured to have a line shape extending from a distal portion of the upper surface of the first blower 10 to a portion adjacent to a central region thereof. The plurality of first discharge holes 120 may be defined in the upper surface of the first blower 10. The plurality of first discharge holes 120 may be evenly arranged to surround a portion of the upper surface of the first blower 10 other than a portion in which the second base 205 is disposed. Further, the second discharge hole 220 may be configured to have a line shape extending from the distal portion of the upper surface of the second blower 20 to a portion adjacent to a central region thereof. The plurality of second discharge holes 220 may defined in the upper surface of the second blower 20. The plurality of second discharge holes 220 may be evenly arranged to surround a portion of the upper surface of the second blower 20 other than a portion in which the guide member 40 is disposed.

Referring to FIG. 6 to FIG. 8, in a state in which the upper surface of the flow adjusting device 30 and the upper surface of the second blower 20 are oriented to be parallel with each other, the flow adjusting device 30 and the second blower 20 are spaced apart from each other, such that at least a portion of the air discharged from the second discharge hole 220 flows along the outer side wall of the flow adjusting device 30 and is discharged to the outside through the space between the flow adjusting device 30 and the second blower 20.

The flow adjusting device 30 may include a rear casing which forms an appearance and is configured to define a rear face of the flow adjusting device 30, and which includes an inhale grill 310 configured to inhale air discharged from the blower 10 and 20. The flow adjusting device 30 may include a front casing 300 fastened to the rear casing and configured to define a front face of the flow adjusting device 30. The front casing 300 may include a discharge grill 320 configured to discharge air inhaled through the inhale grill 310. The flow adjusting device 30 may include a blow fan 360 provided between the front casing 300 and the front casing 300 and configured to generate air flow so that the air inhaled through the inhale grill 310 is discharged through the discharge grill 320. The rear casing includes a rear panel 310 defining the rear face of the flow adjusting device 30, and a side panel 305 extending from the rear panel 310 to the front casing 300 to define a side face of the flow adjusting device 30. The rear panel 310 of the rear casing 300 may be configured to perform the role of the inhale grill 310. That is, a combination of the side panel 305 and the rear panel 310 may form the rear casing 300.

In this connection, a portion of the rear casing other than a portion in which the inhale grill 310 is disposed, that is, a portion in which the side panel 305 is disposed may be formed into a shielded structure to limit air movement. Accordingly, the air discharged from the second discharge hole 220 may be inhaled into the interior of the flow adjusting device 30 only through the inhale grill 310.

The rear panel 310 and side panel 305 may be formed integrally with each other. The side panel 305 and the front casing 300 may be configured to be fastened to each other via, for example, hook fastening.

Based on the operation of the guide member 40, the flow adjusting device 30 may be oriented in the first position, the second position and the third position. While the flow adjusting device 30 is oriented in the first position, the side wall of the rear casing may be spaced apart from the side wall of the second blower 20.

In exemplary embodiments, the side wall of the second blower 20, that is, the side wall of the second casing 200, may be configured to have a tilt perpendicular to the rear panel 310. The side panel 305 may be configured to have an inclined slope with respect to the rear panel 310.

In exemplary embodiments, each of an upper surface and a lower surface of the side panel 305 may be configured to have a ring shape. The circumference of the lower surface of the side panel 305 may be configured to have a smaller size than the circumference of the upper surface of the side panel 305.

In exemplary embodiments, an outer side wall of the side panel 305 may be configured to have a curved shape. In one embodiment, while the flow adjusting device 30 is oriented in the first position, the outer side wall of the side panel 305 may be configured to extend away from the second discharge hole 220 as the side panel approaches the front casing 300.

In exemplary embodiments, while the flow adjusting device 30 is oriented in the first position, the second discharge hole 220 may be configured to be partially covered with the rear grill 310 of the flow adjusting device 30. Accordingly, a portion of the air discharged from the second discharge hole 220 may be discharged to the outside along the outer side wall of the side panel 305. The rest of the air discharged from the second discharge hole 220 may be inhaled into the interior of the flow adjusting device 30 through the rear grill 310.

The second blower 20 is configured to be disposed above the second blow fan 260 and may further include a guide member seat 270 configured so that the guide member 40 is seated thereon. The guide member seat 270 may be controlled to rotate clockwise or counterclockwise. Accordingly, the moving direction of the guide member 40 may be freely adjusted along the circumferential direction.

The second blower 20 may further include a protrusion 280 configured to be disposed the second discharge hole 220 and configured to increase a flow rate of air moving along the inner wall of the second casing 200. The protrusion 280 may have a shape protruding from the inner wall of the second casing 200 in the horizontal direction.

In one example, FIG. 6 and FIG. 7 show only a structure of the second blower 20 and does not show a structure of the first blower 10. The first blower 10 may further include a protrusion (not shown) configured to be disposed the first discharge hole 120 and configured to increase a flow rate of air moving along the inner wall of the first casing 100. The protrusion included in the first blower 10 may have a shape protruding from the inner wall of the first casing 100 in the horizontal direction. When each of the first blower 10 and the second blower 20 includes the protrusion, the protrusion included in the first blower 10 may be referred to as a first protrusion, and the protrusion included in the second blower 20 may be referred to as a second protrusion. However, in the following, for convenience of description, it is not specified whether the first blower 10 includes the first protrusion. However, the second protrusion included in the second blower 20 will be referred to as the protrusion 280.

Each of the second blow fan 260 disposed in the interior of the second blower 20 and the third blow fan 360 disposed in the interior of the flow adjusting device 30 may be embodied as a mixed flow fan.

In one example, FIG. 6 and FIG. 7 show only the structure of the second blower 20, and does not show the structure of the first blower 10. However, the first blow fan 16 disposed in the interior of the first blower 10 may be embodied as a mixed flow fan.

As described above, in a state in which the upper surface of the flow adjusting device 30 and the upper surface of the second blower 20 are oriented horizontally, that is, in the state where the flow adjusting device 30 is oriented in the first position, the side panel 305 of the flow adjusting device 30 and the second discharge hole 220 of the second blower 20 may be spaced apart from each other in the vertical direction. At least a portion of the air discharged from the second discharge hole 220 may be discharged to the outside through a space between the side panel 305 and the second discharge hole 220.

That is, due to a Coandy effect which is the tendency of a fluid jet to stay attached to a convex surface, at least a portion of the air blown upwards along the vertical direction using the second blow fan 260 may be ejected from a portion adjacent to the inner wall of the second casing 200. Then, the air may be discharged directly through the second discharge hole 220 to the outside while bypassing the flow adjusting device 30. Accordingly, components disposed in the flow adjusting device 30 may not act as unnecessary resistance elements against the air flow. Thus, a velocity of the air discharged from the second blower 20 does not decrease, and a blowing distance may be improved. In one example, when the second blower 20 further includes the protrusion 280, the air velocity of the air discharged from the second blower 20 may increase.

FIG. 9 to FIG. 18 are perspective views, cross-sectional views, top views and side elevation views for illustrating an air cleaner according to exemplary embodiments of the present disclosure. Specifically, FIG. 9, FIG. 11, FIG. 14 and FIG. 18 are perspective views. FIG. 10 and FIG. 17 are cross-sectional views. FIG. 12 and FIG. 15 are top views. FIG. 13 and FIG. 16 are side elevation views. In this connection, FIG. 9 is a perspective view to illustrate the overall structure of the air cleaner. FIG. 10 is an enlarged cross-sectional view of a region C of FIG. 9. FIG. 11 to FIG. 18 are diagrams for illustrating an air passage controller included in the air cleaner.

Since the air cleaner described with reference to FIG. 9 to FIG. 18 is substantially the same or similar to the air cleaner as described with reference to FIG. 1 to FIG. 4, the same reference numerals are used for the same components. Detailed description of the same components will be omitted.

Referring to FIG. 9, the air cleaner 1 according to exemplary embodiments of the present disclosure may include the sequentially stacked blowers 10 and 20, the guide member 40, and the flow adjusting device 30. In this connection, the blower 10 and 20 may include the first blower 10 configured to inhale, filter and blow air at a relatively low vertical level, and the second blower 20 disposed above the first blower 10 and configured to inhale, filter and blow air at a relatively high vertical level.

The first blower 10 may include a first casing 100 that defines appearance of the blower, a first filter member 130 disposed in a lower portion of an interior of the first casing 100 to filter air, and a first blow fan 160 disposed in an upper portion of the interior of the first casing 100 to generate air flow. The second blower 20 includes a second casing 200 that defines the appearance, a second filter member 230 disposed in a lower portion of an interior of the second casing 200, and a second blow fan 260 disposed in an upper portion of the interior of the second casing 200 to generate air flow.

In a side wall of the first casing 100, a first inhale hole 110 configured to inhale air from the outside may be defined. The first inhale hole 110 may include a plurality of through-holes passing through at least a portion of the first casing 100. Further, in a side wall of the second casing 200, a second inhale hole 210 configured to inhale air from the outside may be defined. The second inhale hole 210 may include a plurality of through-holes passing through at least a portion of the second casing 100. The first inhale hole 110 may be configured to have a line shape extending from a bottom to a top of the first casing 100. A plurality of first inhale holes 110 may be defined in the side wall of the first casing 100. The plurality of first inhale holes 110 may be evenly arranged in the circumferential direction along an outer circumferential surface of the first casing 100 to enable the air inhale in any direction around the first casing 100. Further, the second inhale hole 210 may be configured to have a line shape extending from a bottom to a top of the second casing 200. A plurality of second inhale holes 210 may be defined in the side wall of the second casing 200. The plurality of second inhale holes 210 may be evenly arranged in the circumferential direction along the outer circumferential surface of the second casing 100 to enable air inhale in any direction around the second casing 200.

Referring to FIG. 10, the first blower 10 may further include a first air passage controller 170 disposed above the first blow fan 160 and in the interior of the first casing 100 and configured to control a flow area of air discharged from the first blow fan 160. The first air passage controller 170 may be configured to selectively close a portion of a flow area in which air flows between the first blow fan 160 and the first discharge hole 120, such that the air discharged from the first blow fan 160 is selectively concentrated on a specific area.

Although not shown, the second blower 20 may further include a second air passage controller (not shown) disposed above the second blow fan 260 and in the interior of the second casing 200 and configured to control the flow area of air discharged from the second blow fan 260. The second air passage controller may be configured to selectively close a portion of the flow area where air flows between the second blow fan 260 and the second discharge hole 220, so that the air discharged from the second blow fan 160 is selectively concentrated on a specific area.

FIG. 10 to FIG. 18 shows only the first air passage controller 170 included in the first blower 10 but does not show the second air passage controller included in the second blower 20. However, the second air passage controller may be configured to have a structure substantially the same as or similar to the first air passage controller 170. Therefore, hereinafter, for convenience of description, only the first air passage controller 170 will be described in detail.

Detailed description of the second air passage controller included in the second blower 20 will be omitted.

The first air passage controller 170 is configured to be rotatable and is disposed above the first blow fan 160. The first air passage controller 170 may include a first frame 170a configured to have a cylinder shape, and a second frame 170b configured to have an upper surface having the same vertical level as an upper surface of the first frame 170a, and spaced from the first frame 170a and having a ring shape surrounding a top of the first frame 170a.

Referring to FIG. 11 to FIG. 13, the first air passage controller 170 may include an air passage control panel disposed between the first frame 170a and the second frame 170b. One end of the control panel is fixed to the first frame 170a, the other end thereof is fixed to the second frame 170b. The control panel is configured to partially cover a space between the first frame 170a and the second frame 170b. The first air passage controller 170 may include an air passage control link 180 disposed in the interior of the first frame 170a. The air passage control link 180 may be connected to the other end of the air passage control panel and configured to induce opening and closing of the air passage control panel. A concentrated air passage 190 may be disposed on a portion of a space between the first frame 170a and the second frame 170b which is not covered with the air passage control panel.

Further, the first air passage controller 170 may include a first actuator disposed in the interior of the first frame 170a and configured to drive the ascending and descending of the air passage control link 180. The first air passage controller 170 may further include a second actuator disposed in the interior of the first frame 170a and configured to drive rotation of the first frame 170a. The first actuator and the second actuator may be spaced apart from each other and disposed in the inner space defined in the first frame 170a.

The first actuator may include a first motor 183 for providing power, a first shaft configured to protrude from one end of the first motor 183 and to be rotatable, and a first wheel 184 coupled to the first shaft. On a portion of an inner wall of the air passage control link 180, a first rail 187 extending along the vertical direction may be disposed. The air passage control link 180 may be controlled such that the first wheel 184 is ascending or descending while rotating in an engaged manner with the first rail 187.

The second actuator may include a second motor 173 for providing power, a second shaft configured to protrude from one end of the second motor 173 and to be rotatable, and a second wheel 174 fastened to the second shaft. On a portion of the inner wall of the first casing 100, a second rail 177 extending along a horizontal direction horizontal to the ground may be disposed. The first frame 170a may be controlled to rotate in the circumferential direction along the inner wall of the first casing 100 while the second wheel 174 rotates in engagement with the second rail 177.

The air passage control panel may include a plurality of control panels 175 and a plurality of through-members 171 respectively passing through the control panels 175 and formed integrally with the control panels 175. Each through-member 171 may be configured to extend through the second frame 170b, the control panel 175 and the first frame 170a sequentially along the horizontal direction.

In exemplary embodiments, each of the control panels 175 may have an annulus sector shape in which both top and bottom sides of the trapezoid are rounded. The plurality of control panels 175 may be arranged to partially fill a space between the first frame 170a and the second frame 170b.

The through-member 171 may be configured to extend through the first frame 170a in one horizontal direction, and, then extend on the upper surface of the air passage control link 180, and then bend and extending in another horizontal direction different from the one horizontal direction.

In exemplary embodiments, the through-member 171 may be configured to extend through the first frame 170a along a first direction of the horizontal direction, and, then extend on the upper surface of the air passage control link 180, and then bend and extending in a second direction of the horizontal direction different from the first direction. In one embodiment, the first direction and the second direction may be orthogonal to each other.

Hereinafter, a portion of the through-member 171 extending along the first direction will be referred to as a first portion. The portion of the through-member 171 extending in the second direction will be referred to as a second portion.

The air passage control link 180 may include a through-fastener 181 configured to protrude from an upper surface. One end of the through-member 171 extending from the control panel 175 and passing through the second frame 170b may be fastened to the second frame 170b. The other end of the through-member 171 extending from the control panel 175 and passing through the first frame 170a may pass through the through-fastener 181 and be fastened to the air passage control link 180.

In exemplary embodiments, when viewed from above, the air passage control link 180 may have a ring shape surrounded with the inner wall of the first frame 170a. The side wall of the first frame 170a may have a ring shape surrounding the outer peripheral surface of the air passage control link 180. The second frame 170b may have a ring shape spaced apart from the first frame 170a.

The plurality of control panels 175 included in the air passage control panel may be evenly arranged in a space between the first frame 170a and the second frame 170b and in the circumferential direction and along the outer peripheral surface of the first frame 170a. the control panel 175 may not be disposed in a portion of the space between the first frame 170a and the second frame 170b. Accordingly, the concentrated air passage 190 in which the air discharged from the first blow fan 160 may intensively flow may be disposed in the portion of the space as not covered with the control panels 175.

The concentrated air passage 190 may be generated only when the air passage control link 180 is controlled to ascend via the first actuator. When the air passage control link 180 is controlled to descend via the first actuator, the passage 190 may not be generated.

In exemplary embodiments, in a state where the air passage control link 180 has ascended, a top portion of the through-fastener 181 may protrude upwards along the vertical direction beyond the first frame 170a and the second frame 170b.

Referring to FIG. 14 to FIG. 16, the air passage control link 180 may be controlled to descend via the first actuator. Accordingly, the air passage control panel may be opened.

Specifically, when the first wheel 184 of the first actuator is rotated in an engage manner with the first rail 187 disposed on the inner surface of the air passage control link 180 such that the air passage control link 180 is controlled to descend, the through-fastener 181 disposed on the upper surface of the air passage control link 180 descends together with the air passage control link 180. A portion of the through-member 171 fastened to the through-fastener 181, that is, the second portion of the through-member 171 that is bent and extends in the second direction moves downward along the vertical direction. The remaining portion of the through-member 171 excluding the second portion of the through-member 171, that is, the first portion extending along the first direction of the through-member 171 may be rotated clockwise or counterclockwise. The control panel 175 fixed to the first portion of the through-member 171 may be rotated together with the through-member 171.

Accordingly, as the plurality of control panels 175 rotate individually, the air passage control panel may be partially opened. The air discharged from the first blow fan 160 may be moved through a specific portion of the space between the first frame 170a and the second frame 170b. In this connection, the specific portion of the space refers to a space in which the concentrated air passage 190 is not disposed.

FIG. 16 shows that when viewed from a side, each of the plurality of control panels 175 is rotated to form an angle not perpendicular to the second frame 170. However, the concept of the present disclosure is not necessarily limited thereto. Each of the plurality of control panels 175 may be rotated to form an angle perpendicular to the second frame 170.

Although not shown in the drawings, the lower surface of the first frame 170a may be configured to have a first opening and a second opening defined at positions corresponding to the outer peripheral portion of the air passage control link 180 and the lower portion of the first rail 187, respectively. The first opening may refer to a region in which the outer peripheral portion of the air passage control link 180 passes through a lower surface of the first frame 170a in the vertical direction when the air passage control link 180 descends. The second opening may refer to a region in which the lower portion of the first rail 187 passes through the lower surface of the first frame 170a in the vertical direction when the air passage control link 180 descends.

In exemplary embodiments, in a state in which the air passage control link 180 has descended, the lower portion of the through-fastener 181 may protrude downward along the vertical direction beyond the lower surface of the first frame 170a.

Referring to FIG. 17, the first rail 187 may be disposed corresponding to a position of the first wheel 184. Accordingly, ascending and descending of the air passage control link 180 may be controlled by the first actuator.

Referring to FIG. 18, the second rail 177 may be disposed to be in contact with the second wheel 174. Accordingly, rotation of the air passage control link 180 in the circumferential direction may be controlled by the second actuator.

Although not shown, the first frame 170a may include a third opening penetrating the lower surface of the first frame 170a in the vertical direction. The second shaft fastened to the second actuator and the second wheel 174 may be moved along the circumferential direction and along the third opening. The third opening may be formed to partially pass through the lower surface of the first frame 170a along the circumferential direction around the central region of the lower surface of the first frame 170a.

In exemplary embodiments, when the first frame 170a is rotated in one direction via the second actuator, the other end of the air passage control panel fixed to the first frame 170a may be rotated in the one direction. Accordingly, the concentrated air passage 190 may be controlled to rotate in the one direction.

As described above, when the air passage control link 180 has descended via the first actuator, the other end of the through-member 171 fastened to the through-fastener 181 is descended together therewith, such that the control panel 175 integrally formed with the through-member 171 may be rotated in one direction and thus the air passage control panel may be controlled to be open. Accordingly, when the air passage control link 180 is controlled to ascend, a portion of the flow area in which air flows between the first blow fan 160 and the first discharge hole 120 may be selectively closed. Accordingly, the air discharged from the first blow fan 160 may be controlled to be selectively blown to a specific area.

Conversely, when the air passage control link 180 ascends via the first actuator, the other end of the through-member 171 fastened to the through-fastener 181 ascends together therewith and thus the control panel 175 integrally formed with the through-member 171 may be rotated in the opposite direction to one direction, and thus the air passage control panel may be controlled to be closed. Accordingly, when the air passage control link 180 is controlled to descend, an entire of the flow area in which air flows between the first blow fan 160 and the first discharge hole 120 may be opened. Accordingly, the air discharged from the first blow fan 160 may be controlled to be blown evenly to all areas.

Further, the air passage control panel 180 may be rotated in the circumferential direction and along the inner wall of the first casing 100 via the second actuator. Accordingly, the concentrated air passage 190 may be controlled to rotate in the circumferential direction.

FIG. 19 to FIG. 26 are perspective views and cross-sectional views for illustrating an air cleaner according to exemplary embodiments of the present disclosure. Specifically, FIG. 19 and FIG. 20 are a perspective view and a cross-sectional view to illustrate the overall structure of the air cleaner. FIG. 21, FIG. 22 and FIG. 23 are drawings for illustrating the first filter member and the first foreign-substance cleaner included in the air cleaner. FIG. 24, FIG. 25 and FIG. 26 are enlarged perspective views of an area D in FIG. 19, respectively.

Since the air cleaner as described with reference to FIG. 19 to FIG. 26 is substantially the same or similar to the air cleaner as described with reference to FIG. 1 to FIG. 4, the same reference numerals are used for the same components, and detailed description of the same components will be omitted.

Referring to FIG. 19 and FIG. 20, the air cleaner 1 according to exemplary embodiments of the present disclosure may include the sequentially stacked blowers 10 and 20, the guide member 40, and the flow adjusting device 30. In this connection, the blower 10 and 20 may include the first blower 10 configured to inhale, filter and blow air at a relatively low vertical level, and the second blower 20 disposed above the first blower 10 and configured to inhale, filter and blow air at a relatively high vertical level.

The first blower 10 may include a first casing 100 that defines appearance of the blower, a first filter member 130 disposed in a lower portion of an interior of the first casing 100 to filter air, and a first blow fan 160 disposed in an upper portion of the interior of the first casing 100 to generate air flow. The second blower 20 includes a second casing 200 that defines the appearance, a second filter member 230 disposed in a lower portion of an interior of the second casing 200, and a second blow fan 260 disposed in an upper portion of the interior of the second casing 200 to generate air flow.

In a side wall of the first casing 100, a first inhale hole 110 configured to inhale air from the outside may be defined. The first inhale hole 110 may include a plurality of through-holes passing through at least a portion of the first casing 100. Further, in a side wall of the second casing 200, a second inhale hole 210 configured to inhale air from the outside may be defined. The second inhale hole 210 may include a plurality of through-holes passing through at least a portion of the second casing 100. The first inhale hole 110 may be configured to have a line shape extending from a bottom to a top of the first casing 100. A plurality of first inhale holes 110 may be defined in the side wall of the first casing 100. The plurality of first inhale holes 110 may be evenly arranged in the circumferential direction along an outer circumferential surface of the first casing 100 to enable the air inhale in any direction around the first casing 100. Further, the second inhale hole 210 may be configured to have a line shape extending from a bottom to a top of the second casing 200. A plurality of second inhale holes 210 may be defined in the side wall of the second casing 200. The plurality of second inhale holes 210 may be evenly arranged in the circumferential direction along the outer circumferential surface of the second casing 100 to enable air inhale in any direction around the second casing 200.

The first blower 10 further includes a third actuator disposed below the first filter member 130 and configured to rotate the first filter member 130, and a first foreign-substance cleaner configured to at least partially contact an outer side wall of the first filter member 130. The first filter member 130 may be rotated via the third actuator. The foreign-substance present on the outer side wall of the first filter member 130 may be removed when the outer side wall of the first filter member 130 contacts the first foreign-substance cleaner.

Although not shown, the second blower 20 further includes a fourth actuator disposed below the second filter member 230 and configured to rotate the second filter member 230, and a second foreign-substance cleaner configured to at least partially contact an outer side wall of the second filter member 230. The second filter member 230 may be rotated via the fourth actuator. The foreign-substance present on the outer side wall of the second filter member 230 may be removed when the outer side wall of the second filter member 230 contacts the second foreign-substance cleaner.

The fourth actuator and the second foreign-substance cleaner included in the second blower 20 may be configured to have substantially the same or similar structures to the third actuator and the first foreign-substance cleaner included in the first blower 10, respectively. Therefore, hereinafter, for convenience of description, only the third actuator and the first foreign-substance cleaner included in the first blower 10 will be described in detail. Detailed description of the fourth actuator and the second foreign-substance cleaner included in the second blower 20 will be omitted.

Referring to FIG. 21 to 23, the first foreign-substance cleaner may include a first dust-collection panel 140 configured to form a portion of the side wall of the first casing 100, a first foreign-substance cleaning module 145 which is fixed to the inner wall of the first dust-collection panel 140 and is configured to contact the outer side wall of the first filter member 130, a first through-hole 149a which is configured to pass through the side wall of the first dust-collection panel 140, and a door 155 disposed on the outer side wall of the casing to open or close the first through-hole 149a.

The third actuator may include a third motor 131 for providing power, a third shaft configured to protrude from one end of the third motor 131 and be rotatable, and a third wheel 132 fastened to the third shaft.

Between the first filter member 130 and the third actuator, a first lower plate 125 may be disposed below the first filter member 130 and may be configured for rotating the first filter member 130. A third rail 133 extending along the circumferential direction around a central region of the first lower plate 125 may be disposed below the first lower plate 125. A third wheel 132 may be configured to rotate in engagement with the third rail 133. Accordingly, the first filter member 130 may be controlled to rotate in the circumferential direction and along the inner wall of the first lower plate 125 via the third actuator.

Referring to FIG. 20 and FIG. 21 together, a first upper plate may be formed above the first filter member 130. Between the first filter member 130 and the first upper plate, a first bearing 135 configured to reduce the frictional force generated when the first filter member 130 rotates may be disposed.

As the first filter member 130 is rotated via the third actuator, the foreign-substance attached to the outer side wall of the first filter member 130 is detached therefrom by the first foreign-substance cleaning module 145 and then goes out through the first through-hole 149a. In one embodiment, the first through-hole 149a may be disposed at a central region of the side wall of the first dust-collection panel 140.

The first foreign-substance cleaning module 145 may include a first foreign-substance cleaning member 145a extending in the vertical direction, and configured such that both ends thereof are fixed to a top and a bottom of the inner wall of the first dust-collection panel 140, respectively, and a second foreign-substance cleaning member 145b extending in the vertical direction and fixed to the first foreign-substance cleaning member 145a. The first foreign-substance cleaning member 145a and the second foreign-substance cleaning member 145b may be sequentially stacked in a direction from the first dust-collection panel 140 toward the first filter member 130. In this connection, the first foreign-substance cleaning member 145a may be disposed adjacent to the outer side wall of the first filter member 130. The second foreign-substance cleaning member 145b may contact the outer side wall of the first filter member 130.

In exemplary embodiments, the first foreign-substance cleaning member 145a may be made of a rubber material to remove a relatively large foreign-substance. The second foreign-substance cleaning member 145b may be embodied as a brush to remove a relatively small foreign-substance.

The inner wall of the first dust-collection panel 140 may have a concave shape toward the first through-hole 149a. The first foreign-substance cleaning module 145 may be configured to extend across the inner wall of the first dust-collection panel 140 and along the vertical direction.

An empty space between the first filter member 130 and the inner wall of the first dust-collection panel 140, except for a region where the first foreign-substance cleaning module 145 is disposed may act as an air passage through which foreign-substances removed from the outer side wall of the first filter member 130 by the first foreign-substance cleaning module 145 may move.

In one example, the first casing 100 may further include a second through-hole 149b configured to pass through the side wall of the first casing 100 and disposed corresponding to a position in which the first through-hole 149a is disposed. A combination of the first through-hole 149a and the second through-hole 149b may define the first through-hole 149. The second through-hole 149b may have a larger diameter than that of the first through-hole 149a.

A shock-absorbing member 150 may be disposed between the first through-hole 149a and the second through-hole 149b. The shock-absorbing member 150 may be made of an elastic rubber material in order to mitigate the shock generated when an external foreign-substance cleaner approaches the first through-hole 149.

In exemplary embodiments, the shock-absorbing member 150 may be configured to have an annular shape in which a central portion is hollow. The annular shape may have a diameter smaller than that of the second through-hole 149b and larger than or equal to that of the first through-hole 149a.

In one example, the shock-absorbing member 150 may include a detection sensor capable of recognizing the external foreign-substance cleaner. When the detection sensor detects the external foreign-substance cleaner, the third actuator may be controlled to be activated.

FIG. 22 does not show the third wheel 132 to show the inner wall of the third rail 133. FIG. 23 does not show the third motor 131 to avoid overlapping explanations. However, those of ordinary skill in the art to which the present disclosure belongs may easily understand that the third wheel 132 is engaged to a top of the third motor 131 and rotates along the third rail 133 disposed between the first lower plate 125 and the third motor 131.

Referring to FIG. 24 to FIG. 26, a first door 155 for opening or closing the first through-hole 149a and the second through-hole 149b may be disposed on the outer side wall of the first casing 100. The first door 155 may be configured to move in an up and down direction or a left and right direction on and along the outer side wall of the first casing 100.

FIG. 24 to FIG. 26 shows that the first door 155 is configured to be movable up and down along the vertical direction. More specifically, FIG. 24 shows that the first door 155 is closed. FIG. 25 shows that the first door 155 is open. FIG. 26 shows cleaning of the first filter member 130 disposed in the interior of the first casing 100 using the external foreign-substance cleaner when the first door 155 is opened.

In one embodiment, the third actuator may be activated only when the first door 155 is open. When the first door 155 is a closed state, the third actuator may be deactivated.

As described above, the first filter member 130 disposed in the interior of the first blower 10 may be controlled to rotate in the circumferential direction via the third actuator disposed below the first filter member 130. The foreign-substance attached to the outer side wall of the first filter member 130 may be detached therefrom using the first foreign-substance cleaning module 145 configured to at least partially contact the outer side wall of the first filter member 130. Thereafter, foreign-substances detached from the first filter member 130 may be removed through the first through-hole 149 using the external foreign-substance cleaner provided outside the first blower 10. Therefore, a user of the air cleaner 1 may easily clean the first filter member 130 disposed in the interior of the first blower 10 without detaching the same.

FIG. 27 to FIG. 34 are perspective views, cross-sectional views and rear views for illustrating the air cleaner according to exemplary embodiments of the present disclosure. Specifically, FIG. 27 is a perspective view for illustrating the overall structure of the air cleaner. FIG. 28 to 34 are enlarged cross-sectional views and enlarged rear views of an area E in FIG. 27. In this connection, FIG. 28 to 34 are diagrams for illustrating the flow adjusting device and the guide member included in the air cleaner.

Since the air cleaner described with reference to FIG. 27 to FIG. 34 is substantially the same or similar to the air cleaner as described with reference to FIG. 1 to FIG. 4, the same reference numerals are used for the same components, and detailed description of the same components will be omitted.

Referring to FIG. 27, the air cleaner 1 according to exemplary embodiments of the present disclosure may include the sequentially stacked blowers 10 and 20, the guide member 40, and the flow adjusting device 30. In this connection, the blower 10 and 20 may include the first blower 10 configured to inhale, filter and blow air at a relatively low vertical level, and the second blower 20 disposed above the first blower 10 and configured to inhale, filter and blow air at a relatively high vertical level.

The first blower 10 may include a first casing 100 that defines appearance of the blower, a first filter member 130 disposed in a lower portion of an interior of the first casing 100 to filter air, and a first blow fan 160 disposed in an upper portion of the interior of the first casing 100 to generate air flow. The second blower 20 includes a second casing 200 that defines the appearance, a second filter member 230 disposed in a lower portion of an interior of the second casing 200, and a second blow fan 260 disposed in an upper portion of the interior of the second casing 200 to generate air flow.

In a side wall of the first casing 100, a first inhale hole 110 configured to inhale air from the outside may be defined. The first inhale hole 110 may include a plurality of through-holes passing through at least a portion of the first casing 100. Further, in a side wall of the second casing 200, a second inhale hole 210 configured to inhale air from the outside may be defined. The second inhale hole 210 may include a plurality of through-holes passing through at least a portion of the second casing 100. The first inhale hole 110 may be configured to have a line shape extending from a bottom to a top of the first casing 100. A plurality of first inhale holes 110 may be defined in the side wall of the first casing 100. The plurality of first inhale holes 110 may be evenly arranged in the circumferential direction along an outer circumferential surface of the first casing 100 to enable the air inhale in any direction around the first casing 100. Further, the second inhale hole 210 may be configured to have a line shape extending from a bottom to a top of the second casing 200. A plurality of second inhale holes 210 may be defined in the side wall of the second casing 200. The plurality of second inhale holes 210 may be evenly arranged in the circumferential direction along the outer circumferential surface of the second casing 100 to enable air inhale in any direction around the second casing 200.

The flow adjusting device 30 may be disposed above the second blower 20, and may be configured to inhale the air discharged from the second blower 20 and control the discharge direction of the inhaled air.

The guide member 40 may be configured such that one end thereof is introduced into the interior of the second blower 20, and the other end thereof is connected to the flow adjusting device 30. The guide member 40 may be controlled to retract into the interior of the second blower 20 or extend from the upper surface of the second blower 20 to induce the position change of the flow adjusting device 30. In exemplary embodiments, an angle formed between the upper surface of the flow adjusting device 30 and the upper surface of the second blower 20 may increase or decrease depending on an extent to which the guide member 40 extends from the upper surface of the second blower 20.

According to the operation of the guide member 40, the position of the flow adjusting device 30 may be switched to between the first position in which the upper surface of the flow adjusting device 30 is parallel with the upper surface of the second blower 20, the second position in which the upper surface of the flow adjusting device 30 is oriented to form a predefined angle with respect to the upper surface of the second blower 20, and a third position in which the upper surface of the flow adjusting device 30 is perpendicular to the upper surface of the second blower 20.

FIG. 28 and FIG. 29 show that the flow adjusting device 30 is oriented in the first position.

Referring to FIG. 28 and FIG. 29, the guide member 40 may include an outer housing 400 defining the appearance and having one end configured to enter the interior of the second blower 20, and configured to extend from the upper surface of the second blower 20, and an inner housing 405 having one end introduced into the interior of the outer housing 400 and the other connected to the flow adjusting device 30. The other end of the inner housing 405 is configured to extend from the other end of the outer housing 400 opposite to the one end of the outer housing 400 received in the interior of the second blower 20. The outer housing 400 may have a structure partially surrounding the inner housing 405.

In exemplary embodiments, the outer housing 400 may have a generally curved pillar shape. The inner housing 405 may have a pillar shape having a size relatively smaller than the pillar shape of the outer housing 400. In this connection, the pillar shape of the outer housing 400 is configured such that an upper surface thereof is opened. The inner housing 405 may be introduced into the interior of the outer housing 400 or may extend from the open top face of the outer housing 400.

The angle defined between the upper surface of the flow adjusting device 30 and the upper surface of the second blower 20 may be increased or decreased primarily depending on the extent to which the outer housing 400 extends from the second blower 20. The angle defined between the upper surface of the flow adjusting device 30 and the upper surface of the second blower 20 may be further increased or decreased secondarily depending on an extent to which the inner housing 405 extends from the outer housing 400.

In exemplary embodiments, while the flow adjusting device 30 is oriented in the first position, the outer housing 400 may be introduced into the interior of the second blower 20 and may not be exposed to the outside.

The guide member 40 includes a fourth actuator 420 disposed in the interior of the second blower 20 and adjacent to the outer face of the outer housing 400, and a fifth actuator 430 disposed in the interior of the inner housing 405 and adjacent to the inner face of the outer housing 400.

The fourth actuator 420 may include a fourth motor 421 for providing power, a fourth shaft 423 configured to protrude from one end of the fourth motor 421 and be rotatable, and a fourth wheel 425 fastened to the fourth shaft 423. The fifth actuator 430 may include a fifth motor 431 for providing power, a fifth shaft 433 configured to protrude from one end of the fifth motor 431 and to be rotatable, and a fifth wheel 435 fastened to the fifth shaft 433.

Referring to FIG. 29 and FIG. 34 together, the outer housing 400 may include a first guide rail 410a configured to extend across the outer face of the outer housing 400 in the longitudinal direction thereof, and a second guide rail 410b configured to extend across the inner face of the outer housing 400 in the longitudinal direction. Each of the first guide rail 410a and the second guide rail 410b may extend across the central region in the longitudinal direction of the outer housing 400. The first guide rail 410a and the second guide rail 410b may face each other. The first guide rail 410a and the second guide rail 410b may be integrally formed with each other to form the guide rail 410.

Referring to FIG. 29 and FIG. 34 together, the inner housing 405 may include a trench 407 configured to extend across the outer face of the inner housing 405 in the longitudinal direction, and a fourth opening oriented to pass through a portion of the trench 407.

The trench 407 may have a recessed shape into the outer face of the inner housing 405, and may be formed corresponding to a position of the second guide rail 410b. That is, the second guide rail 410b formed on the inner face of the outer housing 400 may have a shape protruding toward the outer face of the inner housing 405. In this connection, the trench 407 has a recessed shape into the outer face of the inner housing 40. Thus, the inner housing 405 may extend from the outer housing 400 without being caught by the second guide rail 410b.

The fourth opening may have various shapes such as a polygonal shape and/or a circular shape. The fourth opening may be formed corresponding to a position of the fourth wheel 435 of the fourth actuator 430. That is, the fourth wheel 435 may be engaged with the second guide rail 410b formed on the inner face of the outer housing 400 through the fourth opening. As the fourth wheel 435 rotates, the inner housing 405 may retract into or extend from the outer housing 400.

In exemplary embodiments, the fourth opening may be closer to one end of the inner housing 405 introduced into the interior of the outer housing 400 than to the other end of the inner housing 405 connected to the flow adjusting device 30.

The fourth wheel 425 disposed in the interior of the second blower 20 may be configured to rotate in engagement with the first guide rail 410a. The fifth wheel 435 disposed in the interior of the inner housing 405 may be configured to rotate in engagement with the second guide rail 410b. In exemplary embodiments, the fifth wheel 435 may be closer to one end of the inner housing 405 introduced into the interior of the outer housing 400 than to the other end of the inner housing 405 connected to the flow adjusting device 30.

FIG. 30 and FIG. 31 show that the flow adjusting device 30 is oriented in the second position.

Referring to FIG. 30 and FIG. 31, the position of the flow adjusting device 30 may be switched to between the first position to the second position based on the rotational movement of the fourth wheel 425 included in the fourth actuator 420. In this case, the fifth wheel 435 included in the fifth actuator 430 may be controlled not to rotate.

Specifically, the outer housing 400 may be controlled to retract into the interior of the second blower 20 or to extend from the upper surface of the second blower 20 via the rotational motion of the fourth wheel 425. Accordingly, the position of the flow adjusting device 30 may be switched to between the first position to the second position.

That is, as the fourth wheel 425 rotates in one direction while engaging the first guide rail 410a, the outer housing 400 may extend from the upper surface of the second blower 20. Thus, the flow adjusting device 30 may ascend. Conversely, as the fourth wheel 425 engages the first guide rail 410a and rotates in the opposite direction to the one direction, the outer housing 400 may be introduced into the interior of the second blower 20. In this case, the flow adjusting device 30 may descend.

In exemplary embodiments, the fifth wheel 435 may be controlled not to rotate until the flow adjusting device 30 is oriented in the second position, and may be controlled to rotate only after the flow adjusting device 30 is oriented in the second position.

In exemplary embodiments, while the flow adjusting device 30 is oriented in the second position, the outer housing 400 may at least partially extend from the second blower 20 and be exposed to the outside, but the inner housing 405 retracts into the interior of the outer housing 400 and is not be exposed to the outside.

FIG. 32 to 34 show that the flow adjusting device 30 is oriented in the third position.

Referring to FIG. 32 to FIG. 34, the flow adjusting device 30 may be oriented in the second position or the third position based on the rotational movement of the fifth wheel 435 included in the fifth actuator 430.

Specifically, the inner housing 405 may be controlled to retract into or extend from the outer housing 400 via the rotational motion of the fifth wheel 435. Accordingly, the flow adjusting device 30 may be oriented in the second position or the third position.

That is, as the fifth wheel 435 is engaged with the second guide rail 410*b* through the fourth opening and then rotates in the one direction, the inner housing 405 may extend from the other end of the outer housing 400. In this case, the flow adjusting device 30 may ascend. On the contrary, as the fifth wheel 435 is engaged with the second guide rail 410*b* through the fourth opening and then rotates in the opposite direction to the one direction, the inner housing 405 may be introduced into the interior of the outer housing 400. In this case, the flow adjusting device 30 may descend.

In exemplary embodiments, while the flow adjusting device 30 is oriented in the third position, the outer housing 400 may extend from the second blower 20 and be exposed to the outside. The inner housing 405 may extend from the outer housing 400 and may be exposed to the outside.

As described above, the air cleaner 1 according to exemplary embodiments of the present disclosure may include the sequentially stacked blowers 10 and 20, the guide member 40 and the flow adjusting device 30. The guide member 40 may include the outer housing 400 configured to retract into the interior of the blower 10 and 20, or to extend from the upper surface of the blower 10 and 20, and the inner housing 405 configured to retract into the interior of the outer housing 400 or to extend from the outer housing 400.

In this connection, the angle formed between the upper surface of the flow adjusting device 30 and the upper surface of the blowers 10 and 20 may increase primarily as the outer housing 400 extends from the blower 20. Then, the angle may further increase as the inner housing 405 extends from the outer housing 400.

Therefore, the upper surface of the flow adjusting device 30 may be oriented to be perpendicular to the upper surface of the blower 10 and 20. Thus, the air discharged from the blower 20 is blown farther away through the flow adjusting device 30.

Although various embodiments of the present disclosure have been described above in detail, those having ordinary knowledge in the technical field to which the present disclosure belongs may realize that various modifications may be made to the above-described embodiment as long as they do not depart from the scope of the present disclosure. Therefore, the scope of rights of the present disclosure should not be limited to the described embodiment and should be determined not only by the claims to be described later but also by equivalents thereto.

The invention claimed is:

1. An air cleaner comprising:
    a blower configured to inhale air from an outside, filter the inhaled air, and discharge the filtered air;
    a flow adjusting device including a casing having an inhale port, a discharge port, and a blow fan disposed inside the casing, the flow adjusting device being disposed above the blower and configured to inhale the filtered air discharged from the blower, adjust a discharge direction of the air; and
    a guide member disposed between the blower and the flow adjusting device, connected to each of the blower and the flow adjusting device, and configured to change an angle defined between an upper surface of the flow adjusting device and an upper surface of the blower,
    wherein the guide member includes:
        an outer housing extending in a curved pillar shape and having an interior space and an open top face; and
        an inner housing having a pillar shape with a first end connected to the flow adjusting device, received in the interior space of the outer housing, and configured to extend from the interior space of the outer housing, or to retract into the interior space of the outer housing.

2. The air cleaner of claim 1, wherein the guide member further includes:
    a first guide rail extending across an outer face of the outer housing in a longitudinal direction of the outer housing; and
    a first wheel disposed in an interior of the blower and configured to rotate in engagement with the first guide rail,
    wherein, when the first wheel rotates, the outer housing ascends from or descends to the blower.

3. The air cleaner of claim 2, wherein the guide member further includes:
    a second guide rail extending across an inner face of the outer housing in the longitudinal direction; and
    a second wheel disposed in an interior of the inner housing and configured to rotate in engagement with the second guide rail,
    wherein, when the second wheel rotates, the inner housing extends from the interior space of the outer housing or retracts into the interior space of the outer housing.

4. The air cleaner of claim 3, wherein the flow adjusting device switches between a first position and a second position, based on a movement of the guide member,
    wherein in the first position, the upper surface of the flow adjusting device is parallel with the upper surface of the blower, and
    wherein in the second position, the upper surface of the flow adjusting device forms a predefined acute angle with respect to the upper surface of the blower.

5. The air cleaner of claim 4, wherein the flow adjusting device is oriented in a third position in which the upper surface of the flow adjusting device is perpendicular to the upper surface of the blower, based on the movement of the guide member.

6. The air cleaner of claim 5, wherein, when the flow adjusting device is oriented in the second position, an entirety of the inner housing is positioned in the interior space of the outer housing and is not exposed to the outside, and
    wherein, when the flow adjusting device is oriented in the third position, the inner housing extends from the outer housing and is exposed to the outside.

7. The air cleaner of claim 5, wherein the flow adjusting device switches between the first position and the second position based on a rotational movement of the first wheel, and
wherein the flow adjusting device switches between the second position and the third position based on a rotational movement of the second wheel.

8. The air cleaner of claim 4, wherein, when the flow adjusting device is oriented in the first position, an entirety of the outer housing is positioned in the interior of the blower and is not exposed to the outside, and
wherein, when the flow adjusting device is oriented in the second position, the outer housing at least partially extends from the upper surface of the blower.

9. The air cleaner of claim 3, wherein the angle defined between the upper surface of the flow adjusting device and the upper surface of the blower increases or decreases based on an extent to which the outer housing extends from the blower and based on an extent to which the inner housing extends from the outer housing.

10. The air cleaner of claim 3, wherein the inner housing includes a trench having a recessed shape extending across an outer face of the inner housing in a longitudinal direction of the inner housing.

11. The air cleaner of claim 10, wherein the inner housing further includes an opening passing through a portion of the trench, and
wherein the opening is disposed adjacent to a second end of the inner housing, which is retracted into the interior space of the outer housing, relative to the first end of the inner housing connected to the flow adjusting device.

12. The air cleaner of claim 11, wherein the second wheel is disposed adjacent to the second end of the inner housing, which is retracted into the interior space of the outer housing, relative to the first end of the inner housing connected to the flow adjusting device.

13. The air cleaner of claim 12, wherein the second wheel is configured to rotate engaged with the second guide rail through the opening.

14. The air cleaner of claim 3, wherein the guide member further includes:
a first motor including a rotatable first shaft coupled to the first wheel and configured to rotate the first wheel; and
a second motor disposed in the interior of the inner housing and including a second shaft coupled to the second wheel and configured to rotate the second wheel.

15. The air cleaner of claim 3, wherein, when the angle formed between the upper surface of the blower and the upper surface of the flow adjusting device increases, based on a movement of the guide member, the second wheel is controlled not to rotate until the flow adjusting device is oriented in a second position in which the upper surface of the flow adjusting device forms a predetermined angle with respect to the upper surface of the blower, and is controlled to rotate only after the flow adjusting device is oriented in the second position.

16. The air cleaner of claim 1, wherein the blower includes:
a first blower configured to inhale first air present at a first vertical height and filter and blow the first air; and
a second blower configured to inhale second air present at a second vertical height higher than the first vertical height and filter and blow the second air.

17. The air cleaner of claim 16, wherein the first blower includes:
a first casing;
a first filter member disposed in a lower portion of an interior of the first casing to filter the first air; and
a first blow fan disposed in an upper portion of the interior of the first casing to generate air flow,
wherein the second blower includes:
a second casing;
a second filter member disposed in a lower portion of an interior of the second casing to filter the second air; and
a second blow fan disposed in an upper portion of the interior of the second casing to generate air flow, and
wherein the guide member is configured to be movable while passing through an upper surface of the second casing.

18. An air cleaner comprising:
a blower configured to filter air and to discharge the filtered air;
a flow adjusting device disposed above the blower, including a case having a suction hole, and a discharge hole, and a blowing fan disposed inside the case, and configured to inhale the filtered air discharged from the blower, and adjust a discharge direction of the air; and
a guide member connected to each of the flow adjusting device and the blower, and configured to move the flow adjusting device to adjust the discharge direction of the filtered air,
wherein the guide member includes:
an outer housing extending from an upper surface of the blower; and
an inner housing having a first end positioned in an interior space of the outer housing and a second end connected to the flow adjusting device.

19. The air cleaner of claim 18, wherein the blower includes:
a first blower including:
a first casing having a first inhalation hole for pulling in air;
a first filter member for filtering the air pulled in through the first inhalation hole; and
a first discharge hole for discharging the air filtered by the first filter member; and
a second blower disposed on a base and overlapping the first blower, the second blower including:
a second casing having a second inhalation hole for pulling in air;
a second filter member for filtering the air pulled in through the second inhalation hole; and
a second discharge hole for discharging the air filtered by the second filter member.

20. The air cleaner of claim 18, further comprising:
a first actuator having a first gear wheel; and
a second actuator having a second gear wheel,
wherein the outer housing includes:
a first guide rail engaged by the first gear wheel of the first actuator; and
a second guide rail engaged by the second gear wheel of the second actuator; and
wherein the second gear wheel engages the second guide rail through an opening of the inner housing.

* * * * *